(12) United States Patent
Kramer et al.

(10) Patent No.: US 11,337,541 B2
(45) Date of Patent: May 24, 2022

(54) HIGH PRESSURE, LOW TEMPERATURE, CONTINUOUS FLOW EXTRACTION SYSTEM AND METHOD

(71) Applicant: WKCGRG 2 LLC, Dublin, OH (US)

(72) Inventors: William A. Kramer, Columbus, OH (US); Colin P Giacalone, Columbus, OH (US)

(73) Assignee: WKCGRG 2 LLC, Dublin, OH (US)

( * ) Notice: Subject to any disclaimer, the term of this patent is extended or adjusted under 35 U.S.C. 154(b) by 0 days.

(21) Appl. No.: 16/792,111

(22) Filed: Feb. 14, 2020

(65) Prior Publication Data

US 2021/0251416 A1 Aug. 19, 2021

(51) Int. Cl.
*A47J 31/36* (2006.01)
*A23F 5/26* (2006.01)
*A23F 3/18* (2006.01)
*A47J 31/46* (2006.01)

(52) U.S. Cl.
CPC ............. *A47J 31/3671* (2013.01); *A23F 3/18* (2013.01); *A23F 5/262* (2013.01); *A47J 31/468* (2018.08)

(58) Field of Classification Search
CPC ....... A47J 31/468; A47J 31/3671; A23F 3/18; A23F 5/262
See application file for complete search history.

(56) References Cited

U.S. PATENT DOCUMENTS

| | | | |
|---|---|---|---|
| 2,701,771 A | 2/1955 | Johnson et al. | |
| 3,243,264 A | 3/1966 | Hickey | |
| 3,700,463 A | 10/1972 | Bolt | |
| 4,534,985 A | 8/1985 | Gasau | |
| 4,983,408 A | 1/1991 | Colton | |
| 5,043,178 A | 8/1991 | Gottesman et al. | |
| 5,133,983 A | 7/1992 | Greiwe | |
| 5,402,707 A | 4/1995 | Fond et al. | |
| 5,471,917 A | 12/1995 | Hsu | |
| 5,636,563 A | 6/1997 | Oppermann et al. | |
| 6,426,106 B1 * | 7/2002 | Barrett | A23F 3/16 426/263 |
| 6,623,600 B1 * | 9/2003 | Henriksen | B01D 11/0203 162/21 |

(Continued)

FOREIGN PATENT DOCUMENTS

| | | | |
|---|---|---|---|
| CN | 110156905 | * | 8/2019 |
| DE | 19706005 | | 8/1998 |

(Continued)

OTHER PUBLICATIONS

International Search Report for PCT/US2021/018060 dated Apr. 22, 2021.

(Continued)

*Primary Examiner* — Anthony J Weier
(74) *Attorney, Agent, or Firm* — Steptoe & Johnson LLP; Robert Ford Kappers; Scott Richey

(57) ABSTRACT

High pressure, low temperature, continuous flow extraction systems and methods are designed to produce fluid consumables, including water-based consumables such as coffee or tea. The extraction systems and methods are designed to be safer, more efficient, and more scalable than other known and conventional extraction techniques, and to have significantly quicker extraction times and higher yields.

20 Claims, 8 Drawing Sheets

(56) References Cited

U.S. PATENT DOCUMENTS

| | | | |
|---|---|---|---|
| 8,512,776 B2 | 8/2013 | Yoakim | |
| 9,777,223 B2* | 10/2017 | Iversen | C10G 1/04 |
| 10,053,648 B2 | 8/2018 | Ellis | |
| 10,362,893 B2 | 7/2019 | Dogan et al. | |
| 2016/0374504 A1 | 12/2016 | Hoon | |
| 2017/0325623 A1 | 11/2017 | Lyall, III | |
| 2018/0332996 A1 | 11/2018 | Lee | |
| 2018/0344079 A1 | 12/2018 | Foglia | |
| 2018/0368612 A1 | 12/2018 | Stein | |
| 2021/0251417 A1* | 8/2021 | Kramer | A47J 31/20 |

FOREIGN PATENT DOCUMENTS

| | | |
|---|---|---|
| GB | 871984 | 7/1961 |
| KR | 101630262 | 6/2016 |
| KR | 20160131895 | 11/2016 |
| KR | 101828858 | 2/2018 |
| KR | 101840569 | 3/2018 |
| WO | 2017171740 | 10/2017 |
| WO | 2018115402 | 6/2018 |
| WO | 2019046812 | 3/2019 |

OTHER PUBLICATIONS

Written Opinion for PCT/US2021/018060 dated Apr. 22, 2021.
CONTEX continuous extraction. https://www.gea.com/en/binaries/CONTEX%20Continuous%20Extractor_tcm11-43006.pdf (download date: May 23, 2019).
Toddy Retail Instructions—https://toddycafe.com/ (Version Aug. 2018)(download date: Mar. 16, 2020).
Wilbur Curtis Essence—https://coffeetalk.com/coffeebuzz/04-2019/61814/ (published Jun. 2016) (download date: Apr. 5, 2019).
Wilbur Curtis Cold Brew—https://www.wilburcurtis.com/product/tc-7h (published Sep. 2018) (download date: Mar. 16, 2020).
Yama tower—https://clivecoffee.com/products/yama-cold-brew-drip-tower (download date: Mar. 16, 2020).
Cuisinart Automatic Cold Brew Coffeemaker—https://www.cooksillustrated.com/articles/690-testing-cuisinart-automatic-cold-brew-coffeemaker (published May 30, 2018).
Gourmia GCM6800 automatic cold brew coffee maker—https://www.amazon.com/Gourmia-GCM6800-Automatic-Coffee-Maker/dp/B076VTJ2SD (download date: Jun. 4, 2019).

* cited by examiner

HIGH PRESSURE, LOW TEMPERATURE, CONTINUOUS FLOW EXTRACTION SYSTEM AND METHOD

CROSS REFERENCE TO RELATED APPLICATIONS

[Not Applicable]

FEDERALLY SPONSORED RESEARCH OR DEVELOPMENT

[Not Applicable]

JOINT RESEARCH AGREEMENT

[Not Applicable]

SEQUENCE LISTING

[Not Applicable]

BACKGROUND

Generally speaking, this application describes novel systems and methods for extracting (or leaching) to produce fluid consumables, including water-based consumables such as coffee or tea. In particular, this application describes novel systems and methods for extracting (or leaching) constituent chemical compounds of organic matter such as coffee or tea that may not be extracted by known and conventional extraction techniques using increased temperatures. This application further describes novel systems and methods for extracting (or leaching) constituent chemical compounds of organic matter such as coffee or tea quicker and with higher yields, and that are safer, more efficient, and more scalable than other known and conventional extraction techniques.

SUMMARY OF THE INVENTION

According to certain inventive techniques, a system for producing fluid consumables includes a pump configured to supply a substantially continuous flow of water at greater than atmospheric pressure; a residence vessel coupled to the pump, the residence vessel further comprising: an input aperture, a chamber configured to receive organic matter selected from a group consisting of ground coffee and tea, and configured to sustain greater than atmospheric pressure, and an output aperture; wherein the residence vessel is configured to receive the substantially continuous flow of water supplied by the pump at the input aperture; wherein the pump and residence vessel are configured to cause the water to reside in the chamber with the organic matter at a residence time of between approximately 2 minutes and approximately 30 minutes, at a pressure of between approximately 750 psi and approximately 1500 psi, and at a temperature of between approximately 32° F. and approximately 100° F. to extract chemical compounds from the organic matter during the residence time; and wherein the residence vessel is configured to supply the water having extracted chemicals from the output aperture after residence. The organic matter may be ground coffee. The pressure may be between approximately 900 psi to approximately 1200 psi. The temperature may be between approximately 65° F. and approximately 100° F. The residence time may be between approximately 4 minutes and approximately 25 minutes. The water may be selected from a group consisting of tap water, filtered water, mineral water, and distilled water. The pressure may be approximately 1150 psi and the temperature is approximately 90° F. The residence time may be approximately 5 minutes, approximately 10 minutes, or approximately 20 minutes. The residence vessel may further comprise a first end-cap comprising the input aperture, a second end-cap comprising the output aperture, a capsule substantially comprising the chamber and coupled to the first end-cap and second end-cap, and a filter configured to maintain the ground coffee within the residence vessel.

According to certain inventive techniques, a method for producing fluid consumables includes positioning organic matter selected from a group consisting of ground coffee and tea in a residence vessel, the residence vessel comprising: an input aperture, a chamber configured to receive the organic matter and configured to sustain greater than atmospheric pressure, and an output aperture; supplying a substantially continuous flow of water to the residence vessel at the input aperture; causing the water to reside in the chamber with the organic matter at a residence time of between approximately 2 minutes and approximately 30 minutes, at a pressure of between approximately 750 psi and approximately 1500 psi, and at a temperature of between approximately 32° F. and approximately 100° F. to extract chemical compounds from the organic matter during the residence time; collecting the water having extracted chemicals from the output aperture of the residence vessel after residence. The organic matter may be ground coffee. The pressure may be between approximately 900 psi to approximately 1200 psi. The temperature may be between approximately 65° F. and approximately 100° F. The residence time may be between approximately 4 minutes and approximately 25 minutes. The pressure may be approximately 1150 psi, the temperature may be approximately 90° F., and the residence time may be selected from a group consisting of approximately 5 minutes, approximately 10 minutes, and approximately 20 minutes.

According to certain inventive techniques, an apparatus comprises a residence vessel comprising: an input aperture, a chamber configured to receive organic matter selected from a group consisting of ground coffee and tea and configured to sustain greater than atmospheric pressure, and an output aperture; wherein the residence vessel is configured to receive a substantially continuous flow of water at the input aperture; wherein the residence vessel is configured to cause the water to reside in the chamber with the organic matter at a residence time of between approximately 2 minutes and approximately 30 minutes, at a pressure of between approximately 750 psi and approximately 1500 psi, and at a temperature of between approximately 32° F. and approximately 100° F. to extract chemical compounds from the organic matter during the residence time; and wherein the residence vessel is configured to supply the water having extracted chemicals from the output aperture after residence. The temperature may be between approximately 65° F. and approximately 100° F., the residence time may be between approximately 4 minutes and approximately 25 minutes, and the pressure may be between approximately 900 psi and approximately 1200 psi.

Figure 1:
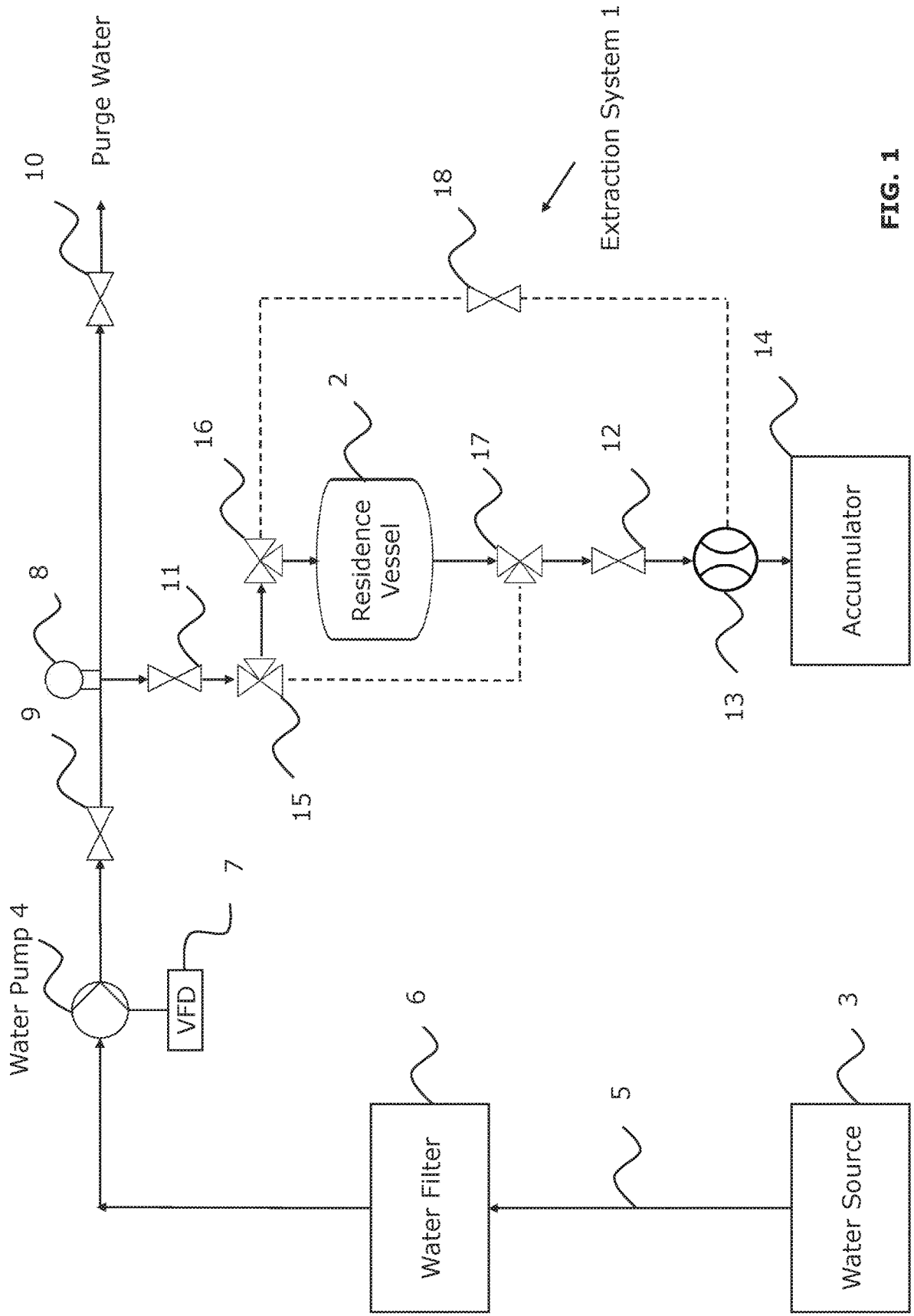
FIG. 1 illustrates a high pressure, low temperature, continuous flow extraction system, according to techniques of the present application.

The foregoing summary, as well as the following detailed description of certain techniques of the present invention, will be better understood when read in conjunction with the appended drawings. For the purposes of illustration, certain techniques are shown in the drawings. It should be understood, however, that the claims are not limited to the arrangements and instrumentality shown in the appended drawings. Furthermore, the appearance shown in the drawings is one of many ornamental appearances that can be employed to achieve the stated functions of the system.

DETAILED DESCRIPTION OF THE APPLICATION

FIG. 1 illustrates various aspects of an exemplary high pressure, low temperature, continuous flow extraction system described in the present application. In particular, FIG. 1 illustrates an extraction system 1. Extraction system 1 may include a residence vessel 2, water source 3, and a water pump 4, each coupled by water lines 5. The extraction system 1 may further optionally include a water filter 6, variable frequency drive ("VFD") 7, pressure gauge 8, check valve 9, plug valve 10, plug valve 11, metering valve 12, flow meter 13, accumulator 14, three-way valve 15, three-way valve 16, three-way valve 17, and metering valve 18.

Residence vessel 2 may be any hollow vessel with a first aperture and a second aperture configured to receive organic matter (e.g., ground coffee or tea) (not illustrated) and fluids such as water, and to sustain increased pressures. In one embodiment, and as further described below including with regard to FIGS. 3-5 and Example 1, residence vessel 2 may be formed of stainless steel (e.g., type 316/316L) and configured to sustain a working pressure up to approximately 1200 psi and more preferably up to approximately 1500 psi.

Water source 3 may be any source of water, for example, a municipal or private supply of processed and treated water conventionally supplied through water pipes, or a container or jug of water. The water from water source 3 may be tap water, filtered water, mineral water, or pure (distilled) water or any other water-based solution, including water-based solutions comprising water and alcohols, minerals, oils, or any other consumable additive or compound. The water from water source 3 may be any temperature, for example, between but between approximately 32° F. and approximately 210° F., more preferably between approximately 32° F. and approximately 100° F., more preferably room temperature (e.g., 65-100° F.), and more preferably 90° F. Extraction system 1 may further comprise a system or device to reduce, raise, or maintain the temperature of the water from water source 3 (not illustrated), if desired, such as a water chiller (or other heat exchanger, mixing valve, or thermostatic mixing valve).

Water pump 4 may be any water pump configured to supply a substantially continuous flow of water to residence vessel 2 at greater than atmospheric pressure. In one embodiment, and as further described below, water pump 4 is adapted to supply water to residence vessel 2 at an increased pressure of up to approximately 1200 psi and more preferably up to approximately 1500 psi. In one embodiment, and as further described below, water pump 4 may be any suitable positive displacement stainless steel pump or a metering pump.

Figure 2:
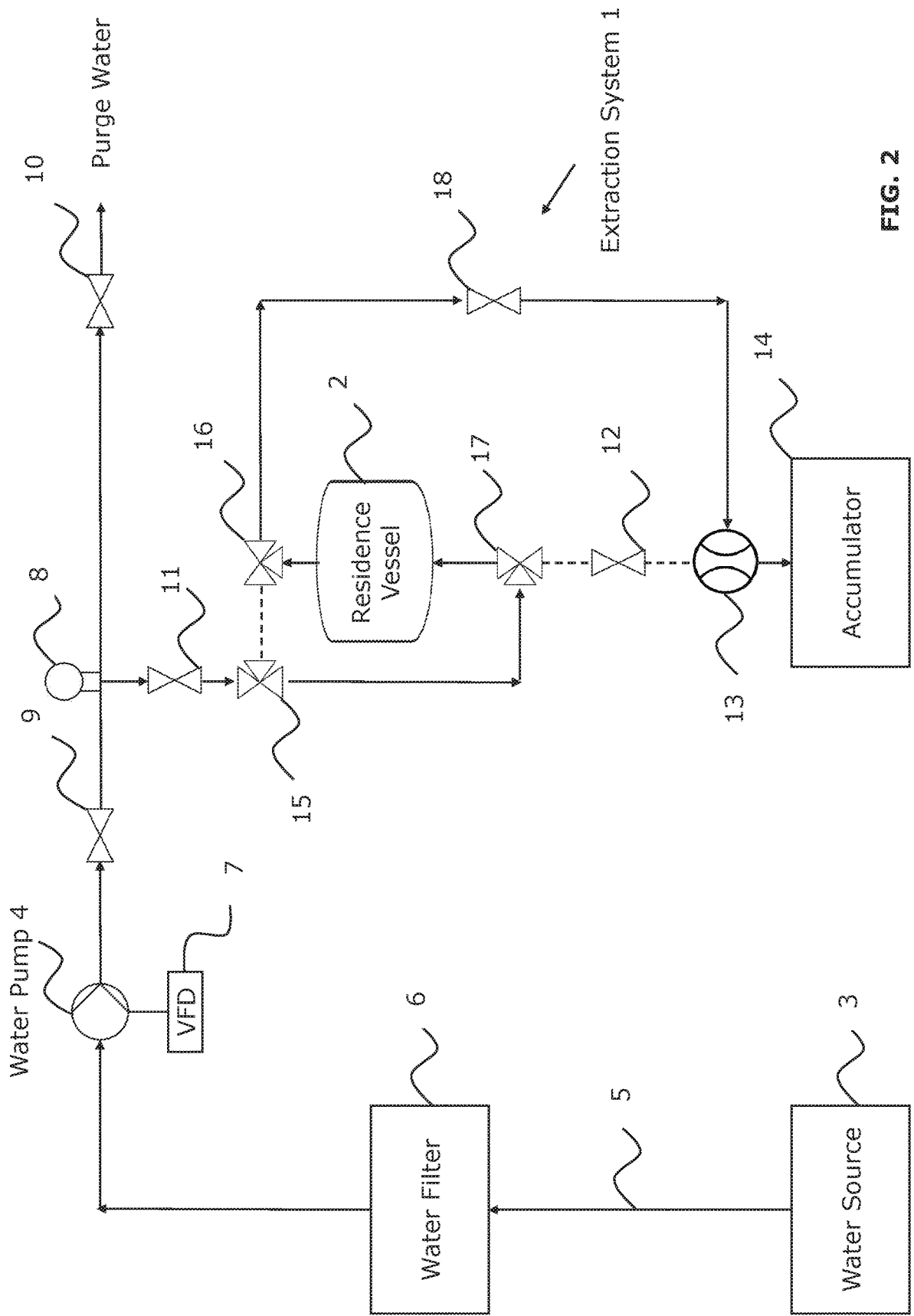
FIG. 2 illustrates a high pressure, low temperature, continuous flow extraction system, according to techniques of the present application.

Water lines 5 may be any water line (e.g., pipe or hose) configured to convey fluid through extraction system 1. In one embodiment, and as further described below, water lines 5 may be configured to sustain an increased pressure of up to approximately 1200 psi and more preferably up to approximately 1500 psi. As illustrated in FIGS. 1 and 2, residence vessel 2, water source 3, water pump 4, water filter 6, pressure gauge 8, check valve 9, plug valves 10 and 11, metering valves 12 and 18, flow meter 13, accumulator 14, and three-way valves 15, 16, and 17 are coupled by water lines 5.

Water filter 6 may be any commercial water filter configured to filter water supplied by water source 3. In one embodiment, and as further described below, water filter 6 may be a water filter provided by Pentair plc, such as the Everpure $MC^2$® water filter.

VFD 7 may be any variable frequency drive (or adjustable speed drive) electronically coupled to water pump 4 and configured to vary the input frequency and voltage to water pump 4 and thereby adjust or control the flow rate of the water supplied by water pump 4. This, in turn, may also be used to adjust or control the pressure of the water supplied by water pump 4. In one embodiment, and as further described below, VFD 7 may be a variable frequency drive, or inverter, capable of converting single-phase 230 VAC to three-phase 230 VAC.

Pressure gauge 8 may be any pressure gauge configured to measure the pressure of the substantially continuous flow of water supplied by the water pump 4. In one embodiment, and as further described below, pressure gauge 8 may be configured to measure increased pressure of up to approximately 1200 psi and more preferably up to approximately 1500 psi. In one embodiment, and as further described below, pressure gauge 8 may be a Swagelok PGI-63C-PG2000-LAQ1, 0-2000, glycerin-filled pressure gauge.

Check valve 9 may be any one-way check valve configured to prevent backflow into the water pump 4 of any water or organic matter from the residence vessel 2. In one embodiment, and as further described below, check valve 9 may be a Swagelok SS-6C-1 Poppet Check Valve.

Plug valves 10 and 11 may be any plug valve configured to be in either an open or closed position to permit the purge of air or gas from the residence vessel 2. In one embodiment, and as further described below, each of plug valves 10 and 11 may be a Swagelok SS-6P4T Quarter Turn Instrument Plug Valve.

Metering valve 12 may be any metering valve configured to provide a controlled, variable flow rate of water (or water having the extracted constituent chemical compounds of the organic matter). In one embodiment, and as further described below, metering valve 12 may be a Swagelok SS-SS4 Low Flow Metering Valve. Metering valve 12 may also be any suitable needle valve.

Flow meter 13 may be any flow meter configured to measure the flow rate of water (or water having the extracted constituent chemical compounds of the organic matter) exiting the residence vessel 2. In one embodiment, and as further described below, flow meter 13 may be configured to measure flow rates of up to approximately 0.25 gallons per minute ("GPM"). In one embodiment, and as further described below, flow meter 13 may be a Swagelok Flowmeter Mini VAF-M1-A6R-1-0-F 0.025-0.25 GPM, or an IFM SM4100 Magnetic-inductive Flow Meter.

Accumulator 14 may be any container configured to accumulate the water having the extracted constituent chemical compounds of the organic matter exiting the residence vessel 2. In one embodiment, and as further described below, accumulator 14 may be a bucket, keg or other container formed of any material, such as stainless steel or plastic.

Three-way valves 15, 16, and 17 may be any three-way valve configured to receive an input water flow and direct an output water flow in one of two directions. In one embodiment, and as further described below, three-way valves 15, 16, and 17 may be a Swagelok SS-44XS6 Three-way Ball Valve.

Metering valve 18 may be any metering valve configured to provide a controlled, variable flow rate of water (or water having the extracted constituent chemical compounds of the organic matter). In one embodiment, and as further described below, metering valve 18 may be a Swagelok SS-SS4 Low Flow Metering Valve. Metering valve 18 may also be any suitable needle valve.

The extraction system 1 may be placed in a forward-flow configuration, wherein three-way valve 15 is turned to a position to direct water received from plug valve 11 to three-way valve 16, three-way valve 16 is turned to a position to direct water received from three-way valve 15 to residence vessel 2 at a first aperture, and three-way valve 17 is turned to a position to direct water received from a second aperture of residence vessel 2 to metering valve 12. In this regard, the first aperture of residence vessel 2 may be considered an input aperture of residence vessel 2 and the second aperture may be considered an output aperture of residence vessel 2. FIG. 1 illustrates this forward-flow configuration with solid water lines 5 (omitting earlier components) between three-way valve 15 and three-way valve 16, between three-way valve 16 and residence vessel 2, between residence vessel 2 and three-way valve 17, between three-way valve 17 and metering valve 12, between metering valve 12 and flow meter 13, and between flow meter 13 and accumulator 14, and dotted water lines 5 between three-way valve 15 and three-way valve 17, between three-way valve 16 and metering valve 18, and between metering valve 18 and flow meter 13. In this manner, FIG. 1 illustrates that extraction system 1 is configured to permit water to flow through solid water lines 5 and not permit water to flow through dotted water lines 5.

The extraction system 1 may also be placed in a reverse-flow configuration, wherein three-way valve 15 is turned to a position to direct water received from plug valve 11 to three-way valve 17, three-way valve 17 is turned to a position to direct water received from three-way valve 15 to residence vessel 2 at the second aperture, and three-way valve 16 is turned to a position to direct water received from the first aperture of residence vessel 2 to metering valve 18. In this regard, the second aperture of residence vessel 2 may be considered an input aperture of residence vessel 2 and the first aperture may be considered an output aperture of residence vessel 2. FIG. 2 illustrates this reverse-flow configuration with solid water lines 5 (omitting earlier components) between three-way valve 15 and three-way valve 17, between three-way valve 17 and residence vessel 2, between residence vessel 2 and three-way valve 16, between three-way valve 16 and metering valve 18, between metering valve 18 and flow meter 13, and between flow meter 13 and accumulator 14, and dotted lines between three-way valve 15 and three-way valve 16, between three-way valve 17 and metering valve 12, and between metering valve 12 and flow meter 13. In this manner, FIG. 2 illustrates that extraction system 1 is configured to permit water to flow through solid water lines 5 and not permit water to flow through dotted water lines 5.

In operation of the extraction system 1 (as described below in regard to FIG. 5), organic matter, such as ground coffee beans, is placed in residence vessel 2. It should be appreciated that the extraction system 1 may be used to extract constituent chemical compounds of other organic matter, such as tea, supplements, or other organic matter that are delicate or incompatible with high temperature extraction systems.

Extraction system 1 may be placed in the forward-flow configuration (illustrated in FIG. 1) and air may first be purged from the extraction system 1. To purge, water pump 4 is turned off, plug valve 11 is turned to the open position, and plug valve 10 is initially turned to the closed position. Water may be supplied by water source 3 to water filter 6 (by turning an unillustrated valve positioned between water source 3 and water filter 6 to the open position, for example) for further filtration. Water may pass through water pump 4, check valve 9, pressure gauge 8 (which may measure and display the water pressure), plug valve 11, three-way valve 15, three-way valve 16, and into residence vessel 2 through the first aperture of the residence vessel 2. With water pump 4 still off, plug valve 10 is oscillated between the closed and open positions (e.g., approximately every 2 seconds) until air has been purged through plug valve 10. After air is purged from the extraction system 1, plug valve 10 is turned to the closed position and plug valve 11 is kept in the open position to direct the water to the residence vessel 2.

Thereafter, water pump 4 is used to pump the processed, filtered water from water filter 6 at a substantially continuous flow rate and a pressure greater than atmospheric pressure. As described further below, water pump 4 supplies the water at an increased pressure of between approximately 750 psi and approximately 1500 psi, more preferably between approximately 900 psi and approximately 1200 psi, more preferably between approximately 1000 and 1150 psi, and more preferably at approximately 1150 psi. VFD 7 and/or metering valve 12 or metering valve 18 may be used to control the flow rate and pressure of the water supplied by water pump 4.

Water from the water pump 4 passes through check valve 9, pressure gauge 8 (which may measure and display the water pressure), plug valve 11, three-way valve 15, three-way valve 16, and into residence vessel 2 through the first aperture of the residence vessel 2. The water passing through extraction system 1 is permitted to reside in residence vessel 2 for a "residence time," described more fully below, such that the water and organic matter steep within residence vessel 2 at an increased pressure for the residence time. After the residence time, water having the extracted constituent chemical compounds of the organic matter exits the residence vessel 2 from the second aperture of the residence vessel 2, passes through the three-way valve 17, metering valve 12, flow meter 13 (which may measure and display the flow rate), and collects in the accumulator 14. Extraction may be complete, for example, after a certain amount of time elapses, after reaching a desired yield (e.g., volume of collected product per initial mass of organic matter) (%), and/or after the collected product has a desired flavor profile or concentration.

Extraction system 1 may optionally be placed in the reverse-flow configuration (illustrated in FIG. 2). In the reverse-flow configuration of extraction system 1, water from the water pump 4 passes through check valve 9, pressure gauge 8 (which may measure and display the water pressure), plug valve 11, three-way valve 15, three-way valve 17, and into residence vessel 2 through the second aperture of the residence vessel 2. The water passing through extraction system 1 is permitted to reside in residence vessel 2 for the "residence time," described herein, such that the water and organic matter steep within residence vessel 2 at an increased pressure for the residence time. After the residence time, water having the extracted constituent chemical compounds of the organic matter exits the residence vessel 2 from the first aperture of the residence vessel 2, passes through the three-way valve 16, metering valve 18, flow meter 13 (which may measure and display the flow rate), and collects in the accumulator 14. In one embodiment, extraction system 1 is placed in the reverse-flow configuration (illustrated in FIG. 2) after the extraction is completed by extraction system 1 in the forward-flow configuration (illustrated in FIG. 1), as described above.

It should be noted that the residence time of the water in the residence vessel 2 is governed by the following equation:

$$\tau = \frac{V}{Q}$$

where $\tau$ is residence time (minutes), V is volume of the residence vessel 2 (gallons), and Q is volumetric flow rate of the water (gallons per minute). Thus, residence time depends on both the volume of the residence vessel 2 and the volumetric flow rate of the water, which further depends on the output of the water pump 4, which may be controlled by VFD 7 and/or metering valve 12 or metering valve 18. It should be appreciated, however, that VFD 7 and/or metering valve 12 or metering valve 18 are optional and the settings of the water pump 4 may be pre-set (or pre-adjusted) to achieve the desired volumetric flow rate of the water. It should also be appreciated that flow meter 13 may be coupled to water pump 4, VFD 7, metering valve 12, and/or metering valve 18 to provide feedback information regarding the flow rate of the water through extraction system 1 to establish and maintain a desired flow rate and residence time. As described further below, the residence time is preferably between approximately 2 minutes and approximately 60 minutes, more preferably between approximately 2 minutes and approximately 30 minutes, more preferably between approximately 4 minutes and approximately 25 minutes, and more preferably approximately 5 minutes, approximately 10 minutes, or approximately 20 minutes.

It should also be appreciated that the increased pressure of the extraction system 1, including within the residence vessel 2, depends on both the volumetric flow rate of the water and the position of metering valve 12 (or metering valve 18). VFD 7 may be used to adjust the pressure of the water by controlling the flow rate of the water supplied by water pump 4. With a relatively constant volumetric flow rate of the water supplied by the water pump 4, pressure will increase as the metering valve 12 (or metering valve 18) is adjusted toward the closed position, and pressure will decrease as the metering valve 12 (or metering valve 18) is adjusted toward the open position. It should be appreciated, however, that the desired pressures may instead be achieved by proper sizing of the output aperture of the residence vessel 2 and, if the output aperture is properly sized, metering valve 12 and metering valve 18 may be optional. And in one alternative embodiment, extraction system 1 (including residence vessel 2) may optionally include one or more pre-sized or adjustable orifice attachments that may couple to residence vessel 2 at the first aperture and/or second aperture of residence vessel 2. In this regard, the one or more pre-sized or adjustable orifice attachments may be the first aperture and/or second aperture (or input aperture and/or output aperture) of residence vessel 2. It should be appreciated that, in this optional embodiment, desired pressures of residence vessel 2 may be achieved by proper sizing of the one or more orifice attachments and, if the one or more orifice attachments are properly sized, metering valve 12 and metering valve 18 may be optional. Again, the desired operating pressure of extraction system 1 within residence vessel 2 is between approximately 750 psi and approximately 1500 psi, more preferably between approximately 900 psi and approximately 1200 psi, more preferably between approximately 1000 and 1150 psi, and more preferably at approximately 1150 psi.

It should be also appreciated that certain components of extraction system 1 are optional, including, for example, certain water lines 5, water filter 6, check valve 9, pressure gauge 8, plug valve 10, plug valve 11, flow meter 13, and accumulator 14. The reverse-flow configuration of extraction system 1 (illustrated in FIG. 2) is also optional and, in this regard, three-way valve 15, three-way valve 16, three-way valve 17, and metering valve 18 are also optional. Moreover, certain components of extraction system 1 illustrated in FIGS. 1 and 2 may be positioned differently and fulfill the same purpose. By way of example, metering valve 12 and/or metering valve 18 may be instead positioned between flow meter 13 and accumulator 14.

Extraction system 1 may be used to produce water-based consumables such as coffee or tea. In this regard, water source 3 of extraction system 1 may be any water-based solution as described above. It should be appreciated from the foregoing description, however, that extraction system 1 may be used to extract (or leach) constituent chemical compounds of organic matter to produce other fluid consumables, including fluid consumables that are not water based. For instance, extraction system 1 of the present application may be used to extract (or leach) constituent chemical compounds of organic matter to produce oil-based fluid consumables. It should be appreciated that, in this regard, water source 3 and other components of extraction system 1 such as residence vessel 2, water pump 4, water lines 5, and/or water filter 6 may be substituted, removed, and/or modified to permit the flow of fluids other than water (or water-based solutions) through extraction system 1, such as oils or oil-based solutions, without departing from the scope of the novel techniques described in this application.

Figure 3:
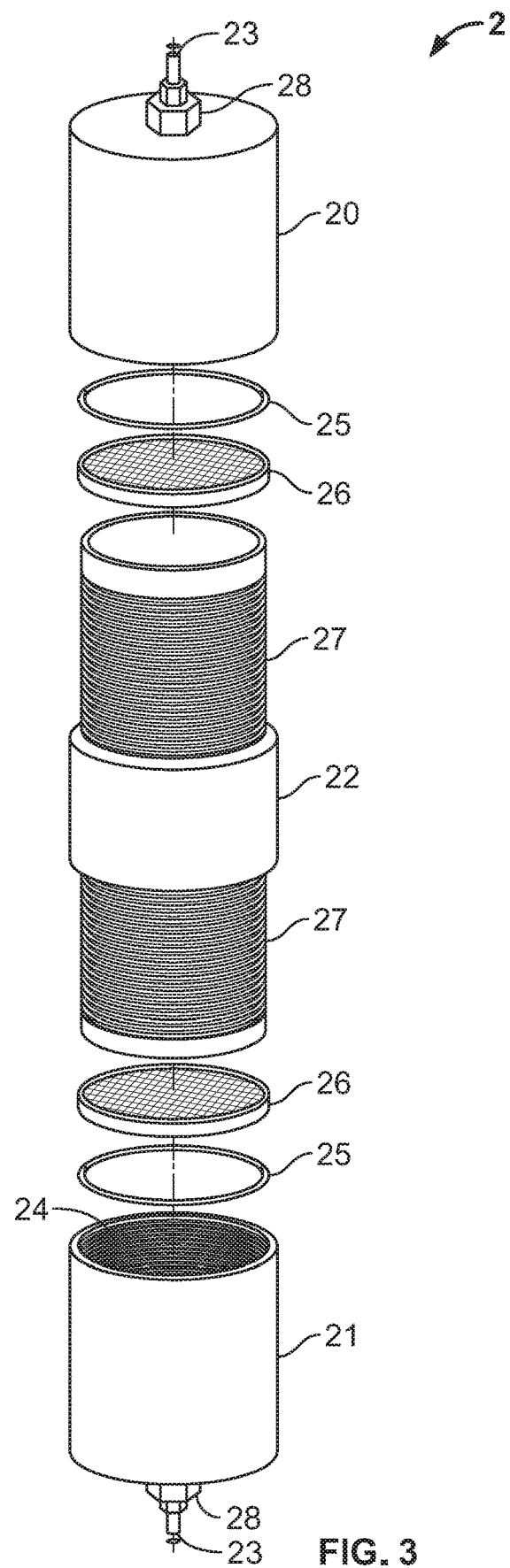
FIG. 3 illustrates a residence chamber of the high pressure, low temperature, continuous flow extraction system of FIGS. 1 and 2, according to the techniques of the present application.

FIG. 3 illustrates one embodiment of residence vessel 2 of the extraction system 1 illustrated in FIGS. 1 and 2. As illustrated in FIG. 3, residence vessel 2 may include a first end cap 20, second end cap 21, and a chamber 22. Both of the first end cap 20 and second end cap 21 have an aperture 23 and internal threads 24, and are adapted to receive an o-ring 25 and filter disk 26. Chamber 22 is fitted with external threads 27 on each end to mate with the internal threads 24 of first end cap 20 and second end cap 21. As described above in reference to FIGS. 1 and 2 and further described herein, residence vessel 2 may be configured to sustain up to approximately 1200 psi and more preferably up to approximately 1500 psi.

In one embodiment, and as further described below, first end cap 20 and second end cap 21 may be formed of stainless steel (e.g., type 316/316L and milled from 316L round bar steel). Internal threads 24 may be NPSM straight pipe threads. The size and length of internal threads 24 of the first end cap 20 and second end cap 21 may vary, but are configured to mate with the external threads 27 on the ends of chamber 22 to securely fasten the first end cap 20 to one end of chamber 22 and the second end cap 21 to the other end of chamber 22. In one embodiment, and as further described below, internal threads 24 may be formed to have 8 threads per inch. Food grade lubricant (not illustrated), such as Bostik Never-Seez White Food Grade Compound with PTFE, may also be provided to internal threads 24 of first end cap 20 and second end cap 21 before mating with the external threads 27 on the ends of chamber 22. First end cap 20 and second end cap 21 may further optionally include grooves (not illustrated) adapted to receive the o-rings 25 and filter disks 26. First end cap 20 and second end cap 21 may further optionally include, or be coupled to, hex nuts 28, which may vary in size and, in one embodiment, may be ⅝-inch hex nuts. Hex nuts 28 may assist in assembly and operation of extraction system 1 and residence vessel 2 and, in particular, may assist in coupling the water line 5 to the first end cap 20 at aperture 23 of the first end cap 20 and coupling the water line 5 to the second end cap 21 at aperture 23 of the second end cap 21. In the forward-flow configuration of extraction system 1 (illustrated in FIG. 1), the aperture 23 of the first end cap 20 may be considered an input aperture and the aperture 23 of the second end cap 21 may be considered an output aperture and, in the reverse-flow configuration of extraction system 1 (illustrated in FIG. 2), the aperture 23 of the second end cap 21 may be considered an input aperture and the aperture 23 of the first end cap 20 may be considered an output aperture. First end cap 20 and second end cap 21 are configured to mate with chamber 22, but the shape and dimensions of the first end cap 20 and second end cap 21 may vary. In one embodiment, and as further described below, first end cap 20 and second end cap 21 are cylindrical with an approximately 4.5 inch inner diameter, approximately 5 inch outer diameter, and approximately a 5 inch length.

Chamber 22 is configured to receive organic matter (e.g., ground coffee or tea) (not illustrated). In one embodiment, and as further described below, chamber 22 is configured to receive at least 1.5 lbs of organic matter (with capacity of up to 1.8 lbs), though the particular amount of organic matter will depend in part on the interior volume of chamber 22. The amount of organic matter chamber 22 is configured to receive will vary based on its size and dimensions, which may also vary as described herein. Chamber 22 may be formed of stainless steel (e.g., type 316/316L and milled from 316L round bar steel). Like internal threads 24, external threads 27 may be NPSM straight pipe threads. The size and length of external threads 27 on the ends of chamber 22 may vary but are configured to mate with the internal threads 24 of the first end cap 20 and second end cap 21. As described above and as further described below, in one embodiment, external threads 27 may be formed to have 8 threads per inch. Food grade lubricant (not illustrated) may also be provided to external threads 27 of each end of chamber 22 before mating with the internal threads 24 of the first end cap 20 and second end cap 21. Chamber 22 is configured to mate with first end cap 20 and second end cap 21, but the shape and dimensions of chamber 22 may vary. In one embodiment, and as further described below, chamber 22 is preferably substantially hollow and cylindrical with an approximately 4-inch inner diameter, approximately 4.5 inch outer diameter, approximately 12 inch length, and chamfered ends.

O-rings 25 may be any suitable o-ring or seal configured to form a seal on one end of chamber 22 between chamber 22 and first end cap 20 and on another end of chamber 22 between chamber 22 and second end cap 21, and configured to sustain the increased pressures within residence vessel 2, e.g., up to approximately 1200 psi and more preferably up to approximately 1500 psi. In one embodiment, and as further described below, o-rings 25 may be 90 durometer o-rings formed of fluoroelastomer material such as FKM.

Filter disks 26 may be any suitable filter configured to substantially maintain the organic matter within residence vessel 2, and substantially permit only water (or water having the extracted constituent chemical compounds of the organic matter) to pass through residence vessel 2. In one embodiment, and as further described below, filter disks 26 may comprise an encasement fitted with a sintered filter mesh. In one embodiment, the encasement may be formed of stainless steel (e.g., type 316/316L and milled from 316L round bar steel or various scheduled 316/316L stainless steel pipe) and the sintered filter mesh may be formed of a sintered stainless steel (e.g., type 316/316L). It should be appreciated that the components, shape, and dimensions of filter disks 26 may vary without departing from their purpose of maintaining organic matter within residence vessel 2. In one embodiment, and as further described below, filter disks 26 comprise a 316L stainless steel circular encasement having a 4.5 inch outer diameter welded to a 20 micron 316L stainless steel sintered filter mesh. Of course, it should be appreciated that filter disks 26 may be formed of other components and materials. For example, the filter screen or mesh of filter disks 26 may comprise woven sintered metal, and may also have a pore size of approximately 2 micron to approximately 200 micron.

Residence vessel 2 of FIG. 3 may be assembled as follows: water line 5 is coupled to second end cap 21 at aperture 23 of the second end cap 21, for example, by screwing a threaded end of water line 5 to a threaded end of hex nut 28 of second end cap 21; food grade lubricant (not pictured) is provided to internal threads 24 of second end cap 21; o-ring 25 and filter disk 26 are positioned within second end cap 21 (for example, at grooves (not illustrated)); food grade lubricant (not pictured) is provided to external threads 27 at each end of chamber 22; second end cap 21 is fastened to chamber 22, for example, by screwing one end of chamber 22 having external threads 27 into the second end cap 21 having internal threads 24 to securely engage external threads 27 and internal threads 24 and securely fasten chamber 22 and second end cap 21; organic matter (e.g., ground coffee or tea) is positioned within chamber 22; o-ring 25 and filter disk 26 are positioned within first end cap 20 (for example, at grooves (not illustrated)); food grade lubricant (not pictured) is provided to internal threads 24 of first end cap 20; first end cap 20 is fastened to chamber 22, for example, by screwing another end of chamber 22 having external threads 27 into the first end cap 20 having internal threads 24 to securely engage external threads 27 and internal threads 24 and securely fasten chamber 22 and first end cap 20; water line 5 is coupled to first end cap 20 at aperture 23 of the first end cap 20, for example, by screwing a threaded end of water line 5 to a threaded end of hex nut 28 of first end cap 20. As described above, in the forward-flow configuration of extraction system 1 (illustrated in FIG. 1), the aperture 23 of the first end cap 20 may receive input water into residence vessel 2 and may be considered an input aperture, and the aperture 23 of the second end cap 21 may provide output water from residence vessel 2 (or water having the extracted constituent chemical compounds of the organic matter) and may be considered an output aperture. And as described above, in the reverse-flow configuration of extraction system 1 (illustrated in FIG. 2), the aperture 23 of the second end cap 21 may receive input water into residence vessel 2 and may be considered an input aperture, and the aperture 23 of the first end cap 20 may provide output water from residence vessel 2 (or water having the extracted constituent chemical compounds of the organic matter) and may be considered an output aperture.

As described above in regard to FIGS. 1 and 2, the output aperture 23 of residence vessel 2 may be properly sized (or adjusted) to ensure the desired pressure of extraction system 1 within residence vessel 2. With a relatively constant volumetric flow rate of the water supplied by the water pump 4, pressure will increase as the size of the output aperture 23 is decreased, and pressure will decrease as the size of the output aperture 23 is increased. In the embodiment of FIG. 3 and in the forward-flow configuration of FIG. 1, for example, aperture 23 of the second end cap 21 may be properly sized (or adjusted) so the desired operating pressure of extraction system 1 within residence vessel 2 is between approximately 750 psi and approximately 1500 psi, more preferably between approximately 900 psi and approximately 1200 psi, more preferably between approximately 1000 and 1150 psi, and more preferably at approximately 1150 psi. By properly sizing (or adjusting) the output aperture of residence vessel 2 (aperture 23 of the second end cap 21 in the example of FIGS. 1 and 3), metering valve 12 of extraction system 1 may be omitted. In the embodiment of FIG. 3 and in the reverse-flow configuration of FIG. 2 for example, aperture 23 of the first end cap 20 may be properly sized (or adjusted) so the desired operating pressure of extraction system 1 within residence vessel 2 is between approximately 750 psi and approximately 1500 psi, more preferably between approximately 900 psi and approximately 1200 psi, more preferably between approximately 1000 and 1150 psi, and more preferably at approximately 1150 psi. By properly sizing (or adjusting) the output aperture of residence vessel 2 (aperture 23 of the first end cap 20 in the example of FIGS. 2 and 3), metering valve 18 of extraction system 1 may be omitted.

Also as described above in regard to FIGS. 1 and 2, one or more pre-sized or adjustable orifice attachments may be coupled to the residence vessel 2 at the first aperture and/or second aperture of residence vessel 2 to ensure the desired pressure of extraction system 1 within residence vessel 2. In this regard, the one or more pre-sized or adjustable orifice attachments may be the first aperture and/or second aperture (or input aperture and/or output aperture) of residence vessel 2. With a relatively constant volumetric flow rate of the water supplied by the water pump 4, pressure will increase as the size of the orifice attachment coupled to the output aperture 23 is decreased, and pressure will decrease as the size of the orifice attachment coupled to the output aperture 23 is increased. In the embodiment of FIG. 3 and in the forward-flow configuration of FIG. 1, for example, an orifice attachment coupled to aperture 23 of the second end cap 21 may be properly sized (or adjusted) so the desired operating pressure of extraction system 1 within residence vessel 2 is between approximately 750 psi and approximately 1500 psi, more preferably between approximately 900 psi and approximately 1200 psi, more preferably between approximately 1000 and 1150 psi, and more preferably at approximately 1150 psi. By properly sizing (or adjusting) the orifice attachment coupled to the output aperture of residence vessel 2 (aperture 23 of the second end cap 21 in the example of FIGS. 1 and 3), metering valve 12 of extraction system 1 may be omitted. In the embodiment of FIG. 3 and in the reverse-flow configuration of FIG. 2 for example, an orifice attachment coupled to aperture 23 of the first end cap 20 may be properly sized (or adjusted) so the desired operating pressure of extraction system 1 within residence vessel 2 is between approximately 750 psi and approximately 1500 psi, more preferably between approximately 900 psi and approximately 1200 psi, more preferably between approximately 1000 and 1150 psi, and more preferably at approximately 1150 psi. By properly sizing (or adjusting) the orifice attachment coupled to the output aperture of residence vessel 2 (aperture 23 of the first end cap 20 in the example of FIGS. 2 and 3), metering valve 18 of extraction system 1 may be omitted.

Residence vessel 2 of FIG. 3 is configured to sustain increased pressure, and is preferably configured to sustain up to approximately 1200 psi and more preferably up to approximately 1500 psi. Residence vessel 2 of FIG. 3 is also configured to receive a substantially continuous flow of water from water pump 4, and to permit the water to reside in residence vessel 2 for a residence time of preferably between approximately 2 minutes and approximately 60 minutes, more preferably between approximately 2 minutes and approximately 30 minutes, more preferably between approximately 4 minutes and approximately 25 minutes, and more preferably approximately 5 minutes, approximately 10 minutes, or approximately 20 minutes. As described above, the shape, size, and dimensions of the components of extraction system 1 of FIGS. 1 and 2, including residence vessel 2 as illustrated in FIG. 3, may vary without departing from the scope of the novel techniques described in this application. For example, increasing the interior volume of residence vessel 2 will increase the amount of organic matter residence vessel 2 may receive. As described above, however, the shape, size, and dimensions of residence vessel 2 may vary without necessarily detracting from the ability of residence vessel 2 to sustain increased pressure, receive a substantially continuous flow of water from water pump 4, or permit the water to reside in residence vessel 2 for the desired residence time, as described herein. The shape, size, and dimensions of other components of extraction system 1 may also vary. For example, because residence time is a function of volume and the flow rate of water, changing the size of residence vessel 2 to increase its interior volume requires an increase in the flow rate of water supplied by water pump 4 to residence vessel 2 to maintain the same desired residence time of the water. Other components of extraction system 1, for example water pump 4 and water lines 5, may be sized and selected to accommodate the need for an increased supply of water to residence vessel 2. In this regard, extraction system 1 is fully scalable.

It should also be appreciated residence vessel 2 may be configured differently than as illustrated in FIG. 3 without departing from the scope of the novel techniques described in this application. For example, other means of securely closing residence vessel 2 are possible, including other means of securely fastening first end cap 20 and second end cap 21 to chamber 22. For example, residence vessel 2 may be securely closed by sealing the first end cap 20 and second end cap 21 to chamber 22 through a linear actuator or other mechanical leverage. One or more of the first end cap 20 and second end cap 21 may also be omitted or otherwise formed in an integral relationship with chamber 22. In one alternative embodiment, for example, second end cap 21 is omitted or otherwise chamber 22 and second end cap 21 are formed in an integral relationship, such that only one end of chamber 22 is provided with external threads 27 to mate with the internal threads 24 of the first end cap 20. Likewise, one or more o-ring 25 and filter disk 26 may be omitted, or may also be integrally fitted within residence vessel 2, including the first end cap 20 and second end cap 21.

In another alternative embodiment, residence vessel 2 may further comprise a filter sleeve for receiving the organic matter (e.g., ground coffee or tea), and for substantially maintaining the organic matter within residence vessel 2 and substantially permitting only water (or water having the extracted constituent chemical compounds of the organic matter) to pass through residence vessel 2. In this regard, the filter sleeve may comprise, receive, or replace the filter disks 26 of the residence vessel 2 of FIG. 3. And in assembling residence vessel 2, in this alternative embodiment, organic matter (e.g., ground coffee or tea) is positioned within the filter sleeve and the filter sleeve is then positioned within residence vessel 2, including within one or more of first end cap 20, second end cap 21, and chamber 22. The filter sleeve is optional and may be used in addition to or substitution for the filter disk 26 and, in this regard, if the filter sleeve substitutes for the filter disk 26 positioned in chamber 22, chamber 22 may receive an o-ring 25 to form a seal between the filter sleeve and chamber 22.

In another alternative embodiment, one or more additional filters may be used in addition to or substitution for filter disks 26 and/or filter sleeves to filter the organic matter and to prevent possible clogging of the filter disks 26 and/or filter sleeves. One such additional filter may be a cotton bag configured to substantially maintain the organic matter within the cotton bag, and substantially permit only water (or water having the extracted constituent chemical compounds of the organic matter) to pass through the cotton bag. In one embodiment, and as further described below, the cotton bag may be a Doppelganger Goods (Alameda, Calif.) Organic Cotton Cold Brew Coffee Bag. It should be appreciated that the material, components, shape, and dimensions of the additional filters may vary. For example, other materials may be used in the additional filters, such as other natural fibrous materials (e.g., wool) or polymeric fibrous filter materials (e.g., nylon). In use and during assembly, organic matter (e.g., ground coffee or tea) may be first positioned in one or more additional filters such as a cotton bag, and then positioned within residence vessel 2, including within one or more of first end cap 20, second end cap 21, and chamber 22. Alternatively, in use and during assembly, organic matter (e.g., ground coffee or tea) may be first positioned in one or more additional filters such as a cotton bag and then positioned in a filter sleeve. Thereafter, the filter sleeve (having the additional filter and organic matter) is positioned within residence vessel 2, including within one or more of first end cap 20, second end cap 21, and chamber 22. The one or more additional filters are optional and may be used in addition to, or in substitute for, filter disks 26 and/or filter sleeves. If an additional filter (e.g., cotton bag) substitutes for a filter disk 26 positioned in chamber 22, the o-ring 25 of chamber 22 may be omitted.

Figure 4:
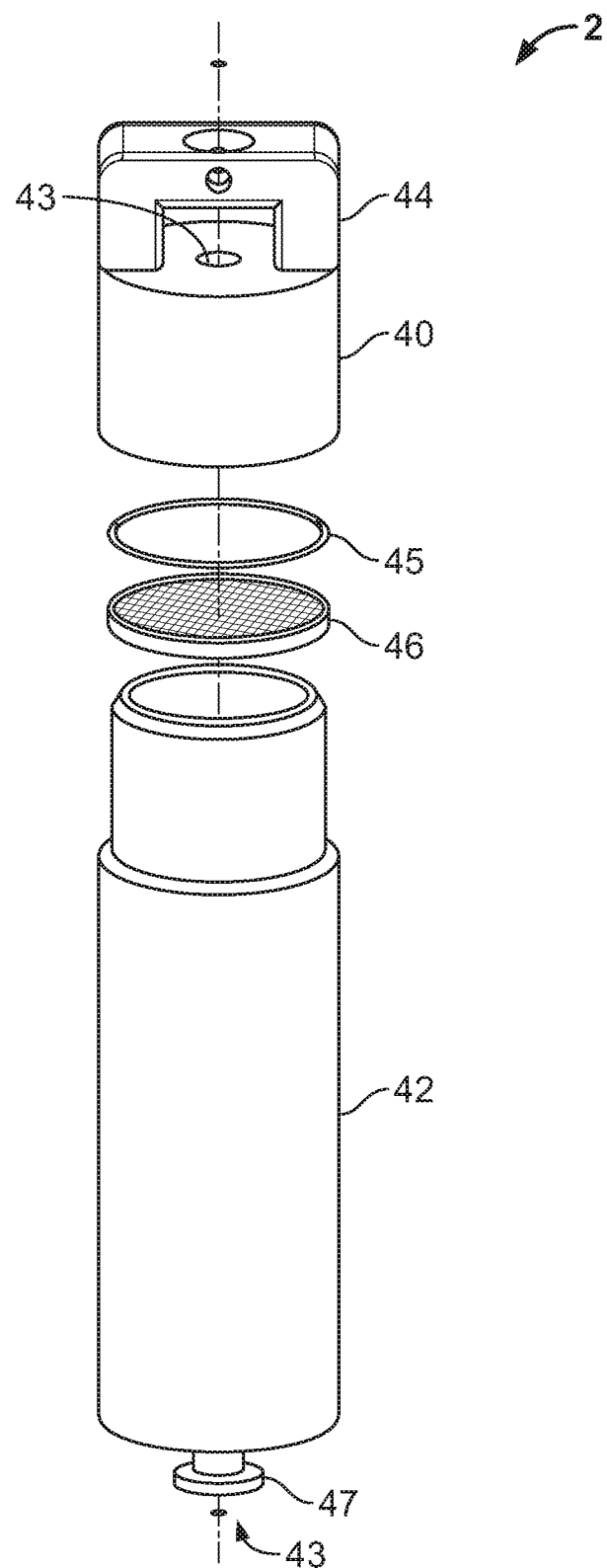
FIG. 4 illustrates a residence chamber of the high pressure, low temperature, continuous flow extraction system of FIGS. 1 and 2, according to the techniques of the present application.

FIG. 4 illustrates one alternative embodiment of residence vessel 2 of the extraction system 1 illustrated in FIGS. 1 and 2. As illustrated in FIG. 4, residence vessel 2 may include a first end cap 40 and a chamber 42. The first end cap has an aperture 43 and a handle 44, and is adapted to receive an o-ring 45 and filter disk 46. Chamber 42 has an aperture 43 and a tab 47 on a first end and a second, open end configured to mate with the first end cap 40. Chamber 42 is also adapted to receive an o-ring 45 and filter disk 46 (o-ring 45 and filter disk 46 of chamber 42 not illustrated) and/or filter sleeve (not illustrated). As described above in reference to FIGS. 1 and 2 and further described herein, residence vessel 2 may be configured to sustain up to approximately 1200 psi and more preferably up to approximately 1500 psi. In this regard, the embodiment of FIG. 4 differs from the embodiment of FIG. 3 in that a second end cap is omitted or otherwise is in an integral relationship with chamber 42, such that only one end of chamber 42 is configured to mate with the first end cap 40 as described herein.

In one embodiment, and as further described below, first end cap 40 may be formed of stainless steel (e.g., type 316/316L and milled from 316L round bar steel). First end cap 40 may include a handle 44 configured to receive an input from a linear actuator (not illustrated) for securing chamber 42 to first end cap 40. In the embodiment of FIG. 4, handle 44 may include apertures for the input (or tip) of a linear actuator and a locking mechanism. Food grade lubricant (not illustrated), such as Bostik Never-Seez White Food Grade Compound with PTFE, may also be provided to the first end cap 40 before mating with the chamber 42. First end cap 40 may further optionally include grooves (not illustrated) adapted to receive the o-ring 45 and filter disk 46. First end cap 40 may further optionally include, or be coupled to, a hex nut or right angle adaptor (not illustrated). The hex nut or right angle adaptor, which may vary in size, may assist in assembly and operation of extraction system 1 and residence vessel 2 and, in particular, may assist in coupling the water line 5 to the first end cap 40 at aperture 43 of the first end cap 40. For example, a right angle adaptor may couple to the first end cap 40 at aperture 43 underneath handle 44 to permit coupling water line 5 to the first end cap 40 using, for example, Swagelok quick connects (e.g., SS Full Flow Quick Connect Body, 2.8 Cv, ⅜" Tube Fitting (SS-QF4-B-600) and SS Full Flow Quick Connect Stem, ⅜" MNPT, Cv 1.7 (SS-QF4-S-6PM)).

In the forward-flow configuration of extraction system 1 (illustrated in FIG. 1), the aperture 43 of the first end cap 40 may be considered an input aperture and the aperture 43 of chamber 42 may be considered an output aperture, and in the reverse-flow configuration of extraction system 1 (illustrated in FIG. 2), the aperture 43 of the first end cap 40 may be considered an output aperture and the aperture 43 of chamber 42 may be considered an input aperture. First end cap 40 is configured to mate with chamber 42, but the shape and dimensions of the first end cap 40 may vary. In one embodiment, and as further described below, first end cap 40 is cylindrical with an approximately 4.5 inch inner diameter, approximately 5 inch outer diameter, and approximately a 5 inch length.

Chamber 42 is configured to receive organic matter (e.g., ground coffee or tea) (not illustrated). In one embodiment, and as further described below, chamber 42 is configured to receive at least 1.5 lbs of organic matter (with capacity of up to 1.8 lbs), though the particular amount of organic matter will depend in part on the interior volume of chamber 42. The amount of organic matter chamber 42 is configured to receive will vary based on its size and dimensions, which may also vary as described herein. Chamber 42 may be formed of stainless steel (e.g., type 316/316L and milled from 316L round bar steel). Chamber 42 has an aperture 43 and a tab 47 on a first end. Tab 47 may be configured to mate with a track of a housing for extraction system 1 (not illustrated) configured to receive chamber 42, among other components not illustrated in FIG. 4 (e.g., linear actuator, valves, etc.), to position chamber 42 beneath first end cap 40 before securing chamber 42 to first end cap 40. Chamber 42 also has a second, open end configured to mate with the first end cap 40. Food grade lubricant (not illustrated) may be provided to the second, open end of chamber 42 before mating with the first end cap 40. Chamber 42 may further optionally include grooves (not illustrated) adapted to receive the o-ring 45 and filter disk 46 (o-ring 45 and filter disk 46 of chamber 42 not illustrated) and/or filter sleeve (not illustrated). Chamber 42 may further optionally include, or be coupled to, a hex nut (not illustrated), which may vary in size and may assist in assembly and operation of extraction system 1 and residence vessel 2 and, in particular, may assist in coupling the water line 5 to chamber 42 at aperture 43 of chamber 42. In the forward-flow configuration of extraction system 1 (illustrated in FIG. 1), the aperture 43 of the first end cap 40 may be considered an input aperture and the aperture 43 of chamber 42 may be considered an output aperture, and in the reverse-flow configuration of extraction system 1 (illustrated in FIG. 2), the aperture 43 of the first end cap 40 may be considered an output aperture and the aperture 43 of chamber 42 may be considered an input aperture. Chamber 42 is configured to mate with first end cap 40, but the shape and dimensions of chamber 42 may vary. In one embodiment, and as further described below, chamber 42 is preferably substantially hollow and cylindrical with an approximately 4-inch inner diameter, approximately 4.5 inch outer diameter, approximately 12 inch length.

O-rings 45 may be any suitable o-ring or seal configured to form a seal between chamber 42 and first end cap 40 and between chamber 42 and filter disk 46 and/or filter sleeve (not illustrated), and configured to sustain the increased pressures within residence vessel 2, e.g., up to approximately 1200 psi and more preferably up to approximately 1500 psi. In one embodiment, and as further described below, o-rings 45 may be 90 durometer o-rings formed of fluoroelastomer material such as FKM.

Filter disks 46 may be any suitable filter configured to substantially maintain the organic matter within residence vessel 2, and substantially permit only water (or water having the extracted constituent chemical compounds of the organic matter) to pass through residence vessel 2. In one embodiment, and as further described below, filter disk 46 may comprise an encasement fitted with a sintered filter mesh. In one embodiment, the encasement may be formed of stainless steel (e.g., type 316/316L and milled from 316L round bar steel or various scheduled 316/316L stainless steel pipe) and the sintered filter mesh may be formed of a sintered stainless steel (e.g., type 316/316L). It should be appreciated that the components, shape, and dimensions of filter disk 46 may vary without departing from their purpose of maintaining organic matter within residence vessel 2. In one embodiment, and as further described below, filter disk 46 comprise a 316L stainless steel circular encasement having a 4.5 inch outer diameter welded to a 20 micron 316L stainless steel sintered filter mesh. Of course, it should be appreciated that filter disk 46 may be formed of other components and materials. For example, the filter screen or mesh of filter disk 46 may comprise woven sintered metal, and may also have a pore size of approximately 2 micron to approximately 200 micron.

The filter sleeve (not illustrated) may be any suitable filter configured to substantially maintain the organic matter within residence vessel 2, and substantially permit only water (or water having the extracted constituent chemical compounds of the organic matter) to pass through residence vessel 2. In one embodiment, and as further described below, the filter sleeve may comprise a cylindrical encasement fitted with a sintered filter mesh having one end closed by a sintered filter mesh and another end having an aperture. In one embodiment, the encasement may be formed of stainless steel (e.g., type 316/316L and milled from 316L round bar steel or various scheduled 316/316L stainless steel pipe) and the sintered filter mesh may be formed of a sintered stainless steel (e.g., type 316/316L). It should be appreciated that the components, shape, and dimensions of the filter sleeve may vary without departing from their purpose of maintaining organic matter within residence vessel 2. In one embodiment, and as further described below, the filter sleeve may comprise a 316L stainless steel cylindrical encasement having a 4.5 inch outer diameter welded to a 20 micron 316L stainless steel sintered filter mesh on one end and along its length. Of course, it should be appreciated that the filter sleeve may be formed of other components and materials. For example, the filter screen or mesh of the filter sleeve may comprise woven sintered metal, and may also have a pore size of approximately 2 micron to approximately 200 micron. The filter sleeve is optional and may be used in addition to or substitution for the filter disk 46 and, in this regard, if the filter sleeve substitutes for the filter disk 46 positioned in chamber 42, chamber 42 may receive an o-ring 45 to form a seal between the filter sleeve and chamber 42.

Residence vessel 2 of FIG. 4 may be assembled as follows: chamber 42 is positioned into a housing for extraction system 1 by mating tab 47 with a track of the housing; water line 5 is coupled to chamber 42 at aperture 43 of the chamber 42 using, for example, Swagelok quick connects (e.g., SS Full Flow Quick Connect Body, 2.8 Cv, ⅜" Tube Fitting (SS-QF4-B-600) and SS Full Flow Quick Connect Stem, ⅜" MNPT, Cv 1.7 (SS-QF4-S-6PM)); o-ring 45 and filter disk 46 are positioned within chamber 42 proximate to aperture 43 of chamber 42 (for example, at grooves (not illustrated)); organic matter (e.g., ground coffee or tea) is positioned within chamber 42; o-ring 45 and filter disk 46 are positioned within first end cap 40 proximate to aperture 43 of the first end cap 40 (for example, at grooves (not illustrated)); food grade lubricant (not pictured) is provided the first end cap 40 and second, open end of chamber 42; first end cap 40 is positioned into a housing for extraction system 1 and secured to a linear actuator at handle 44; first end cap 40 is securely fastened to chamber 42, for example, by operation of the linear actuator; water line 5 is coupled to first end cap 40 at aperture 43 of the first end cap 40 using, for example, Swagelok quick connects (e.g., SS Full Flow Quick Connect Body, 2.8 Cv, ⅜" Tube Fitting (SS-QF4-B-600) and SS Full Flow Quick Connect Stem, ⅜" MNPT, Cv 1.7 (SS-QF4-S-6PM)). As described above, in the forward-flow configuration of extraction system 1 (illustrated in FIG. 1), the aperture 43 of the first end cap 40 may receive input water into residence vessel 2 and may be considered an input aperture, and the aperture 43 of the chamber 42 may provide output water from residence vessel 2 (or water having the extracted constituent chemical compounds of the organic matter) and may be considered an output aperture. And as described above, in the reverse-flow configuration of extraction system 1 (illustrated in FIG. 2), the aperture 43 of the chamber 42 may receive input water into residence vessel 2 and may be considered an input aperture, and the aperture 43 of the first end cap 40 may provide output water from residence vessel 2 (or water having the extracted constituent chemical compounds of the organic matter) and may be considered an output aperture.

As described above in regard to FIGS. 1 and 2, the output aperture 43 of residence vessel 2 may be properly sized (or adjusted) to ensure the desired pressure of extraction system 1 within residence vessel 2. With a relatively constant volumetric flow rate of the water supplied by the water pump 4, pressure will increase as the size of the output aperture 43 is decreased, and pressure will decrease as the size of the output aperture 43 is increased. In the embodiment of FIG. 4 and in the forward-flow configuration of FIG. 1, for example, aperture 43 of the chamber 42 may be properly sized (or adjusted) so the desired operating pressure of extraction system 1 within residence vessel 2 is between approximately 750 psi and approximately 1500 psi, more preferably between approximately 900 psi and approximately 1200 psi, more preferably between approximately 1000 and 1150 psi, and more preferably at approximately 1150 psi. By properly sizing (or adjusting) the output aperture of residence vessel 2 (aperture 43 of the chamber 42 in the example of FIGS. 1 and 4), metering valve 12 of extraction system 1 may be omitted. In the embodiment of FIG. 4 and in the reverse-flow configuration of FIG. 2 for example, aperture 43 of the first end cap 40 may be properly sized (or adjusted) so the desired operating pressure of extraction system 1 within residence vessel 2 is between approximately 750 psi and approximately 1500 psi, more preferably between approximately 900 psi and approximately 1200 psi, more preferably between approximately 1000 and 1150 psi, and more preferably at approximately 1150 psi. By properly sizing (or adjusting) the output aperture of residence vessel 2 (aperture 43 of the first end cap 40 in the example of FIGS. 2 and 4), metering valve 18 of extraction system 1 may be omitted.

Also as described above in regard to FIGS. 1 and 2, one or more pre-sized or adjustable orifice attachments may be coupled to the residence vessel 2 at the first aperture and/or second aperture of residence vessel 2 (e.g., aperture 43 of first end cap 40 and/or aperture 43 of chamber 42) to ensure the desired pressure of extraction system 1 within residence vessel 2. In this regard, the one or more pre-sized or adjustable orifice attachments may be the first aperture and/or second aperture (or input aperture and/or output aperture) of residence vessel 2. With a relatively constant volumetric flow rate of the water supplied by the water pump 4, pressure will increase as the size of the orifice attachment coupled to the output aperture 43 is decreased, and pressure will decrease as the size of the orifice attachment coupled to the output aperture 43 is increased. In the embodiment of FIG. 4 and in the forward-flow configuration of FIG. 1, for example, an orifice attachment coupled to aperture 43 of the chamber 42 may be properly sized (or adjusted) so the desired operating pressure of extraction system 1 within residence vessel 2 is between approximately 750 psi and approximately 1500 psi, more preferably between approximately 900 psi and approximately 1200 psi, more preferably between approximately 1000 and 1150 psi, and more preferably at approximately 1150 psi. By properly sizing (or adjusting) the orifice attachment coupled to the output aperture of residence vessel 2 (aperture 43 of the chamber 42 in the example of FIGS. 1 and 4), metering valve 12 of extraction system 1 may be omitted. In the embodiment of FIG. 4 and in the reverse-flow configuration of FIG. 2 for example, an orifice attachment coupled to aperture 43 of the first end cap 40 may be properly sized (or adjusted) so the desired operating pressure of extraction system 1 within residence vessel 2 is between approximately 750 psi and approximately 1500 psi, more preferably between approximately 900 psi and approximately 1200 psi, more preferably between approximately 1000 and 1150 psi, and more preferably at approximately 1150 psi. By properly sizing (or adjusting) the orifice attachment coupled to the output aperture of residence vessel 2 (aperture 43 of the first end cap 40 in the example of FIGS. 2 and 4), metering valve 18 of extraction system 1 may be omitted.

Residence vessel 2 of FIG. 4 is configured to sustain increased pressure, and is preferably configured to sustain up to approximately 1200 psi and more preferably up to approximately 1500 psi. Residence vessel 2 of FIG. 4 is also configured to receive a substantially continuous flow of water from water pump 4, and to permit the water to reside in residence vessel 2 for a residence time of preferably between approximately 2 minutes and approximately 60 minutes, more preferably between approximately 2 minutes and approximately 30 minutes, more preferably between approximately 4 minutes and approximately 25 minutes, and more preferably approximately 5 minutes, approximately 10 minutes, or approximately 20 minutes. As described above, the shape, size, and dimensions of the components of extraction system 1 of FIGS. 1 and 2, including residence vessel 2 as illustrated in FIG. 4, may vary without departing from the scope of the novel techniques described in this application. For example, increasing the interior volume of residence vessel 2 will increase the amount of organic matter residence vessel 2 may receive. As described above, however, the shape, size, and dimensions of residence vessel 2 may vary without necessarily detracting from the ability of residence vessel 2 to sustain increased pressure, receive a substantially continuous flow of water from water pump 4, or permit the water to reside in residence vessel 2 for the desired residence time, as described herein. The shape, size, and dimensions of other components of extraction system 1 may also vary. For example, because residence time is a function of volume and the flow rate of water, changing the size of residence vessel 2 to increase its interior volume requires an increase in the flow rate of water supplied by water pump 4 to residence vessel 2 to maintain the same desired residence time of the water. Other components of extraction system 1, for example water pump 4 and water lines 5, may be sized and selected to accommodate the need for an increased supply of water to residence vessel 2. In this regard, extraction system 1 is fully scalable.

It should also be appreciated residence vessel 2 may be configured differently than as illustrated in FIG. 4 without departing from the scope of the novel techniques described in this application. For example, other means of securely closing residence vessel 2 are possible, including other means of securely fastening first end cap 40 to chamber 42. For example, residence vessel 2 may be securely closed by sealing the first end cap 40 to chamber 42 through screw threads or other mechanical leverage.

In another alternative embodiment, as described above in regard to FIG. 3, one or more additional filters may be used in addition to or substitution for the filter disk 46 and/or filter sleeve to filter the organic matter and to prevent possible clogging of the filter disk 46 and/or filter sleeve. In use and during assembly, organic matter (e.g., ground coffee or tea) may be first positioned in one or more additional filters such as a cotton bag and then positioned in the chamber 42 or filter sleeve (which may thereafter be positioned within residence vessel 2). In this regard, if an additional filter substitutes for the filter disk 46 positioned in chamber 42, the o-ring 45 of chamber 42 may be omitted.

Figure 5:
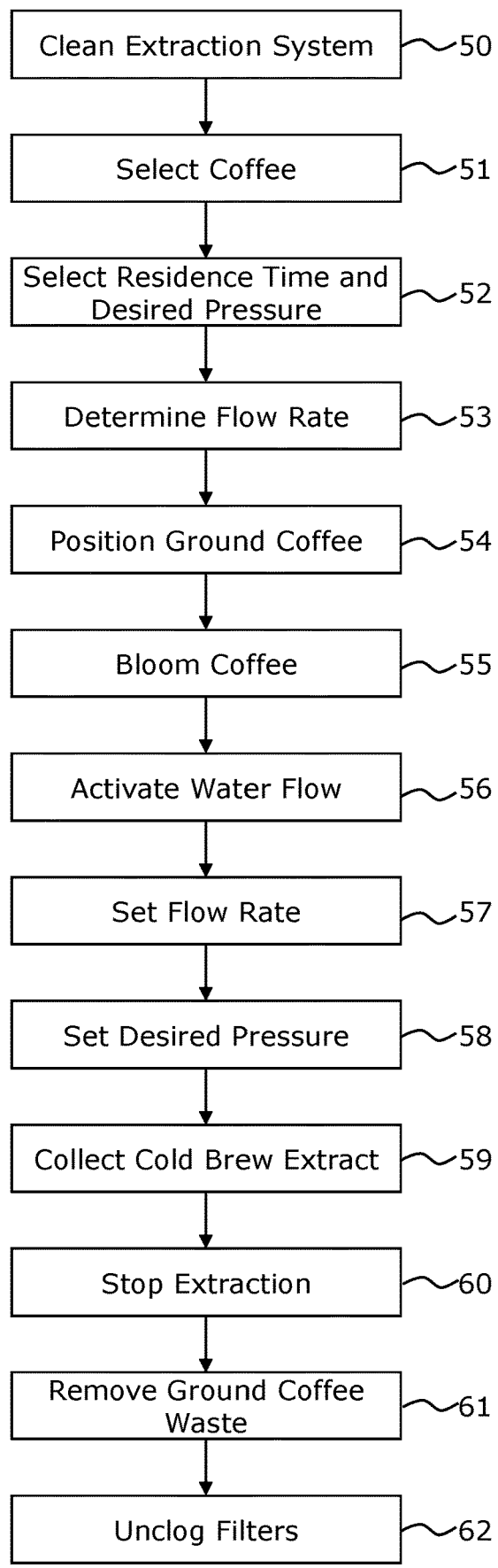
FIG. 5 illustrates a flow chart for a method of extraction, according to the techniques of the present application.

FIG. 5 illustrates a flow chart for a method that may be performed when producing fluid consumables, cold brew coffee brewed using room temperatures (e.g., 65-100° F.) or reduced temperatures (e.g., 32-65° F.), in this embodiment, using the extraction system 1 (including residence vessel 2) of FIGS. 1-4 as described in the present application.

As illustrated by numeral 50 of FIG. 5, "Clean Extraction System," extraction system 1 of FIGS. 1-4 may be cleaned before operation so as to remove debris and contamination, including debris and contamination from prior use of extraction system 1 such as remaining ground coffee waste. For example, residence vessel 2 (including any filter disks, filter sleeves, and additional filters) may be removed from extraction system 1 for ease of cleaning. Thereafter, residence vessel 2 may be returned to reassemble extraction system 1, which may then be flushed with water such as water from water source 3. Extraction system 1 may also be cleaned by flushing the extraction system 1 with high-pressure water in one or more of the reverse-flow configuration and forward-flow configuration.

As illustrated by numeral 51 of FIG. 5, "Select Coffee," the coffee is selected before the brewing process. Various considerations may include the type of the coffee bean, as well as roast type (e.g., light or dark roast), roast date, and grind size. Coffee may be selected as whole bean coffee (not pre-ground) or ground coffee and, if whole bean, should be ground after selection. The above considerations (coffee bean type, roast type, roast date, and grind size) may impact the flavor profile of the coffee. In this regard, a user may select the coffee to achieve a wide range of desirable (and preferred) flavor profiles of cold brew coffee. As described below, the results of coffee cupping forms, TDS %, and Brix % may be used to evaluate the impact of the type of the coffee bean, as well as roast type (e.g., light or dark roast), roast date, and grind size on the concentration and flavor profile of the corresponding cold brew coffee product, and allow a user to select desired parameters.

It should be appreciated that any coffee bean type, roast type, roast date, and grind size may be selected. Preferably, the grind size is between approximately 300 micron and approximately 1750 micron, more preferably between approximately 800 micron and approximately 1000 micron, and more preferably 900 micron. It should also be appreciated that any roast type (e.g., dark roast or light roast) may be selected. Using dark roasted coffee beans may result in a cold brew coffee product resembling that of the dark roast, and may include flavors described as cocoa, nutty, spicy, and/or sweet flavors. Using light (or medium) roasted coffee beans may result in a cold brew coffee product resembling more of the natural flavors of the coffee beans, and may include flavors described as sweet, floral, fruity, sour, and/or vegetative. In this regard, extraction system 1 is configured to extract constituent chemical compounds associated with natural qualities and flavors of the coffee beans that are often not extracted by traditional systems and methods for producing cold brew coffee. Extraction system 1 may therefore produce unique, full-flavored cold brew coffee in comparison to traditional systems and methods, and do so using any roast type. Moreover, coffee beans having an older roast date (e.g., more than 20 days post-roast) may be successfully used in extraction system 1, which is configured and equipped to extract the constituent chemical compounds of the beans through high pressure, low temperature, and continuous flow, whereas traditional systems and methods for producing cold brew coffee are not usually suitable to produce cold brew coffee from coffee beans having an older roast date. Extraction system 1 therefore may reduce waste and cost associated with unused coffee beans having an older roast date.

As illustrated by numeral 52 of FIG. 5, "Select Residence Time and Desired Pressure," the user may pre-select both the residence time and pressure of the water within the residence vessel 2 of extraction system 1. Various considerations may impact these selections, such as the desired concentration and flavor profile of the cold brew coffee product and the desired speed of extraction. Coffee cupping forms, for example, may be used to evaluate the impact of different residence times and pressures on the concentration and flavor profile of the corresponding cold brew coffee product, and allow a user to select a desired residence time and desired pressure based on the coffee cupping form results. One example of a coffee cupping form that may be used is the Specialty Coffee Association of America Coffee Cupping Form, which permits users to individually score the fragrance/aroma, flavor, aftertaste, acidity, intensity, body, level, uniformity, balance, clean cup, and sweetness of the cold brew coffee produced by extraction system 1. The residence time and desired pressure may be selected based on one or more of the individual categories and/or the overall score of the cupping forms. For example, extraction system 1 may be operated at a range of operating residence times and pressures to produce different cold brew coffee products, each produced at a different residence time and pressure. A user may use the results of prior coffee cupping forms for each different cold brew coffee product to select a desired residence time and desired pressure. Additionally, longer residence times, e.g., 20 minutes, 30 minutes, or 60 minutes, and higher pressures, e.g., 1500 psi, produce a stronger, higher concentrated cold brew product, than do shorter residence times, e.g., 2 minutes, 4 minutes, or 5 minutes, and lower pressures, e.g., 750 psi. Concentration may be determined by qualitative metrics such as taste (measured by cupping forms, for example), but also quantitative metrics such as total dissolved solids % ("TDS %") and Brix %. TDS % and Brix % may be particularly useful metrics for monitoring the progress of extraction system 1, as described below. As described herein, the water residence time is preferably between approximately 2 minutes and approximately 60 minutes, more preferably between approximately 2 minutes and approximately 30 minutes, more preferably between approximately 4 minutes and approximately 25 minutes, and more preferably approximately 5 minutes, approximately 10 minutes, or approximately 20 minutes and the pressure is preferably between approximately 750 psi and approximately 1500 psi, more preferably between approximately 900 psi and approximately 1200 psi, more preferably between approximately 1000 and 1150 psi, and more preferably at approximately 1150 psi.

It should also be appreciated that metrics such as the results of coffee cupping forms, TDS %, and Brix % may also be used to evaluate the impact of other parameters on the concentration and flavor profile of the corresponding cold brew coffee product, including, for example, water temperature, bloom temperature, type of the coffee bean, roast type (e.g., light or dark roast), roast date, and grind size, and allow a user to select a desired setting for a particular parameter based on the coffee cupping form results. In this regard, extraction system 1 may be operated using a range of parameters (e.g., temperature, pressure, residence time, type of the coffee bean, roast type, roast date, and grind size) to produce different cold brew coffee products, each produced at a different combination of operating parameters. Prior coffee cupping forms, for example, may be used for each different cold brew coffee product to select each desired operating parameters. As described herein, the water temperature is preferably between approximately 32° F. and approximately 100° F., more preferably room temperature (e.g., 65-100° F.), and more preferably 90° F., the bloom temperature is preferably between approximately 32° F. and approximately 100° F., more preferably room temperature (e.g., 65-100° F.), and more preferably 90° F., and the grind size is preferably between approximately 300 micron and approximately 1200 micron, more preferably between approximately 800 micron and approximately 1000 micron, and more preferably 900 micron.

As illustrated by numeral 53 of FIG. 5, "Determine Flow Rate," the flow rate of the water supplied to the residence vessel 2 from water pump 4 is determined from the volume of the residence vessel 2 (V) and the selected residence time (τ), as governed by the following equation:

$$\tau = \frac{V}{Q}$$

For example, operating extraction system 1 with a residence vessel 2 having a volume of 0.65 gallons and a residence time of 5 minutes requires approximately 0.13 gallons per minute of water supplied to the residence vessel 2 from water pump 4. Similarly, operating extraction system 1 with a residence vessel 2 having a volume of 0.65 gallons and a residence time of 10 minutes requires approximately 0.065 gallons per minute of water supplied to the residence vessel 2 from water pump 4.

As illustrated by numeral 54 of FIG. 5, "Position Ground Coffee In Residence Vessel," the ground coffee beans are positioned within residence vessel 2 of extraction system 1. In the embodiment illustrated by FIG. 3, for example, residence vessel 2 may be opened by removing one or more of the first end cap 20 and second end cap 21 from chamber 22. Thereafter, the ground coffee may be positioned within one or more of first end cap 20, second end cap 21, and chamber 22, and residence vessel 2 may be closed or reassembled by securely fastening first end cap 20 and second end cap 21 to chamber 22. The ground coffee should be positioned within residence vessel 2 in a manner that permits filter disks 26 to substantially maintain the organic matter within residence vessel 2 and substantially permit only water (or water having the extracted constituent chemical compounds of the organic matter) to pass through residence vessel 2. As described above, in one embodiment (such as the embodiment of FIG. 4), the ground coffee may be positioned within a filter sleeve configured to substantially maintain the organic matter within residence vessel 2 and substantially permit only water (or water having the extracted constituent chemical compounds of the organic matter) to pass through residence vessel 2. In this embodiment, the filter sleeve is then positioned within residence vessel 2. As described above, in another embodiment, one or more additional filters (e.g., cotton bag) may be used in addition to or substitution for filter disks and/or filter sleeves to filter the organic matter and to prevent possible clogging of the filter disks and/or filter sleeves. In this embodiment, the ground coffee may be positioned within one or more additional filters, which may then be positioned in within residence vessel 2 or positioned within a filter sleeve then positioned within residence vessel 2.

As illustrated by numeral 55 of FIG. 5, "Bloom Coffee," the ground coffee may optionally be permitted to bloom (or degas). In this regard, a pre-determined amount of water is supplied to the residence vessel 2, through water lines 5 for example, and is permitted to mix with and seep through the ground coffee. The ground coffee is then permitted to bloom for between approximately 5 minutes to approximately 20 minutes, and preferably for approximately 10 minutes. The temperature of the water may be room temperature (e.g., 65-100° F.) and may preferably be approximately 90° F. It should be appreciated, however, that the temperature of the water used to bloom the coffee may be higher than 100° F.

As illustrated by numeral 56 of FIG. 5, "Activate Water Flow," water to and through extraction system 1, including to and through residence vessel 2, may be activated. Water may then be supplied to the extraction system 1 (including residence vessel 2) by water source 3. The water from water source 3 may be tap water, filtered water, mineral water, or pure (distilled) water or any other water-based solution, including water-based solutions comprising water and alcohols, minerals, oils, or any other consumable additive or compound. The water from water source 3 may be any temperature, for example, between approximately 32° F. and approximately 210° F., preferably between approximately 32° F. and approximately 100° F., more preferably room temperature (e.g., 65-100° F.), and more preferably 90° F. Water may be supplied by water source 3 to water filter 6 for further filtration. Plug valves 10 and 11 of extraction system 1 may be manipulated to purge any remaining air or gas within extraction system 1, including residence vessel 2. Once purged, water pump 4 is used to pump the processed, filtered water from water filter 6 to residence vessel 2, plug valve 10 is turned to the closed position and plug valve 11 is turned to the open position so as to direct water to residence vessel 2 in either of the forward-flow configuration of FIG. 1 or reverse-flow configuration of FIG. 2.

As illustrated by numeral 57 of FIG. 5, "Set Flow Rate," the flow rate of water is set to supply a substantially continuous flow of water to the residence vessel 2 from water pump 4. As described above in regard to FIGS. 1-4, this flow rate of water may be adjusted or controlled by VFD 7, which in turn adjusts or controls the output of water pump 4, and/or metering valve 12 or metering valve 18. Alternatively, the settings of the water pump 4 may be set or adjusted to adjust or control the flow rate of water. As described above in regard to FIGS. 1-4, flow meter 13 may optionally be coupled to water pump 4 and/or VFD 7 to provide feedback information regarding the flow rate of the water through extraction system 1 to ensure a substantially continuous flow to the residence vessel 2 from water pump 4.

As illustrated by numeral 58 of FIG. 5, "Set Desired Pressure," the increased pressure of the water within residence vessel 2 may be set. Pressure will begin to increase within residence vessel 2 as water from water pump 4 is supplied to and starts accumulating within residence vessel 2 before exiting residence vessel 2 through the output aperture of residence vessel 2. As described above, with regard to FIGS. 1-4, the increased pressure within residence vessel 2 depends on the volumetric flow rate of the water and constriction size of the output from residence vessel 2, e.g., the position of metering valve 12 or metering valve 18, the size of the output aperture of the residence vessel 2, and/or the size of the one or more pre-sized or adjustable orifice attachments.

As illustrated by numeral 59 of FIG. 5, "Collect Cold Brew Extract," the output of residence vessel 2 is collected in accumulator 14, which may be any bucket, keg or other container formed of any material, such as stainless steel or plastic.

As illustrated by numeral 60 of FIG. 5, "Stop Extraction," extraction by extraction system 1 may be stopped, for example, after a certain amount of time elapses, after reaching a desired yield (e.g., volume of collected product per initial mass of organic matter), and/or after the collected product has a desired flavor profile or concentration. When the extraction is complete, extraction system 1 may be shut off by, among other things, turning off water pump 4 and the supply of water from water source 3. The output product of extraction system 1 collected in accumulator 14 may be stored in a refrigerator and, in one embodiment, may first be diluted with water to achieve a desired yield, concentration, and/or flavor profile.

As illustrated by numeral 61 of FIG. 5, "Remove Ground Coffee Waste," the ground coffee waste (e.g., the wet ground coffee beans after extraction) may be removed after the extraction process is stopped or complete. In the embodiment illustrated by FIG. 3, for example, residence vessel 2 may be opened by removing one or more of the first end cap 20 and second end cap 21 from chamber 22. Thereafter, the ground coffee waste may be removed from within the one or more of first end cap 20, second end cap 21, and chamber 22, and then preferably discarded. As described above, in another embodiment, the filter sleeve having the ground coffee waste may be removed from residence vessel 2, and, thereafter, the ground coffee waste may be removed from the filter sleeve. As described above, in another embodiment, the additional filter (e.g., cotton bag) may be removed from the residence vessel and/or filter sleeve, and, thereafter, the ground coffee waste may be removed from the additional filter (e.g., coffee bag).

As illustrated by numeral 62 of FIG. 5, "Unclog Filters," the filters of the extraction system 1, e.g., one or more filter disks, filter sleeves, and/or additional filters of residence vessel 2, may be unclogged of any wasted ground coffee that clogged the pores of the filters during operation. In one embodiment, filter disks, filter sleeves, and/or additional filters are removed from residence vessel 2 and cleaned to unclog any wasted ground coffee. In another embodiment, one or more filter disks and/or filter sleeves are removed from residence vessel 2, inverted by, for example, flipping filter disks and/or filter sleeves 180°, and re-positioned within residence vessel 2. Filter disks and/or filter sleeves may be unclogged by operating extraction system 1 as described herein without ground coffee.

In another embodiment, filter disks and/or filter sleeves may be unclogged through back-flushing extraction system 1 and residence vessel 2. In this regard, as illustrated by FIGS. 1 and 2, water may be redirected into residence vessel 2 through the aperture that initially served as an input aperture, for example, by a water line 5 from water pump 4. In one embodiment, extraction system 1 is permitted to operate (for example, by performing the steps indicated by numerals 50 through 61 of FIG. 5) in the forward-flow configuration of FIG. 1. At the step indicated by numeral 62 of FIG. 5, "Unclog Filters," extraction system 1 may be switched to the reverse-flow configuration of FIG. 2 to backflush the extraction system 1 and unclog the filter disks and/or filter sleeves. In this regard, three-way valve 15, three-way valve 16, and three-way valve 17 are turned to a position to re-direct water to the aperture of residence vessel 2 that served as the output aperture for residence vessel 2 in the forward-flow configuration. As with the metering valve 12 of extraction system 1 in the forward-flow configuration of FIG. 1, metering valve 18 of extraction system 1 in the backflush, reverse-flow configuration of FIG. 2 may be used to adjust or control the increased pressure of the water within residence vessel 2 (back-pressure, in this example). Similarly, as with the aperture of residence vessel 2 that served as the output aperture for residence vessel 2 in the forward-flow configuration, the size of the output aperture of residence vessel 2 in the backflush, reverse-flow configuration of FIG. 2 may also be pre-set or adjusted to control the increased pressure of the water within residence vessel 2, as described herein. Similarly, as described above in regard to FIGS. 1-4, it should be appreciated that the increased pressure of the water within residence vessel 2 in the backflush, reverse-flow configuration of FIG. 2 may be achieved by the use and proper sizing of one or more pre-sized or adjustable orifice attachments that may couple to residence vessel 2 at the output aperture of the residence vessel 2 in the backflush, reverse-flow configuration of FIG. 2. In one embodiment, extraction system 1 may include automated valves that re-direct the water flow through the aperture of residence vessel 2. Back-flushing extraction system 1 and residence vessel 2 as described herein may unclog filter disks and/or filter sleeves. In one embodiment, the pores of the filter disks and/or filter sleeves proximal to the input aperture of the residence vessel 2 in the forward-flow configuration may be larger than the pores of the filter disks and/or filter sleeves proximal to the output aperture of the residence vessel 2 in the forward-flow configuration. In this regard, switching extraction system 1 from a forward-flow configuration of FIG. 1 to a reverse-flow configuration of FIG. 2 may permit ground coffee waste unclogged from the smaller pores of the filter disks and/or filter sleeves proximal to the output aperture of the residence vessel 2 in the forward-flow configuration of FIG. 1 (input aperture in the reverse-flow configuration of FIG. 2) to pass freely through the larger pores of the filter disks and/or filter sleeves proximal to the input aperture of the residence vessel 2 in the forward-flow configuration of FIG. 1 (output aperture in the reverse-flow configuration of FIG. 2).

FIG. 5 illustrates several steps of a method that may be performed when producing cold brew coffee using the extraction system of FIGS. 1-4 and further disclosed in this application. However, it should be appreciated that more or fewer steps may be performed. One additional step may include sieving the ground coffee before positioning it in the residence vessel. This "sieve" step, and the optional use of the additional filter (e.g., cotton bag) as described above, may be particularly useful if a user experiences clogging of filters with ground coffee waste, as it will ensure that the ground coffee has a uniform and suitable size (e.g., larger than the pore size of the filters) so as to no longer cause clogging. This additional step may serve as a substitute for or addition to the "Unclog Filters" step illustrated by numeral 62 of FIG. 5. As a further example, extraction system 1 may employ pulses of pressure to facilitate extraction. This "pulsation" step may be particularly useful to facilitate extraction because the bursts of increased pressure may force the water into the ground coffee, including into void spaces of the ground coffee previously not in contact with water, the subsequent release of pressure may allow the water to leave the ground coffee (having the extracted constituent chemical compounds of the coffee), and the change of pressure causes agitation of the water and ground coffee mixture which improves extraction efficiency. As a further example, a user of extraction system 1 may elect to not perform several steps, such as the "Bloom Coffee" step illustrated by numeral 55 of FIG. 5. The steps of the method of FIG. 5 may also be performed in various other orders.

It should also be appreciated, of course, that the steps of the method of FIG. 5 may be automated. For example, the selection of residence times and pressures as illustrated by numeral 52 of FIG. 5 may be automated and associated with more user-friendly selections, such as those corresponding to a desired flavor profile, extraction time, and/or total run time. In this regard, for example, an operator of the system may simply select a desired flavor profile of the cold brew coffee, which may automatically select a pre-set or automated residence time and pressure of extraction system 1. As another example, the flow rate of water supplied to the residence vessel 2 from water pump 4, as illustrated by numeral 53 of FIG. 5, may automatically be determined from the volume of residence vessel 2 and the residence time. Each of the other steps of the method of FIG. 5 may also be automated, including the positioning of each valve of the extraction system 1.

Example 1

The following describes one particular example of a cold brew coffee extraction system of FIGS. 1-5 and further disclosed in this application, and the use thereof. The extraction system of Example 1 is assembled according to FIGS. 1-3 and comprises:

- Residence vessel: a chamber formed of 316L stainless steel milled from 316L round bar steel and having an inner diameter of approximately 4 inches, outer diameter of approximately 4.5 inches at its threads, and a length of approximately 12 inches, with two chamfered ends threaded with external NPSM straight pipe threads (8 threads per inch); a first and second end cap securely fastened to the chamber and formed of 316L stainless steel milled from 316L round bar steel and having an inner diameter of approximately 4.5 inches, outer diameter of approximately 5 inches, and a length of approximately 5 inches, with internal NPSM straight pipe threads (8 threads per inch); an o-ring fitted within each of the first and second end caps and formed of 90 durometer FKM; a filter disk comprising an encasement and a sintered filter mesh, wherein the encasement is formed of stainless steel (e.g., type 316/316L and milled from 316L round bar steel) and has an outer diameter of approximately 4.5 inches, and wherein the sintered filter mesh may be formed of a sintered stainless steel (e.g., type 316/316L) having a pore size of approximately 20 micron; and a cotton bag, wherein the cotton bag is a Doppelganger Goods (Alameda, Calif.) Organic Cotton Cold Brew Coffee Bag.
- Water source: municipal water supply.
- Water pump: positive displacement stainless steel pump adapted to supply increased pressure of up to approximately 1500 psi.
- VFD: variable frequency drive, or inverter, capable of converting single-phase 230 VAC to three-phase 230 VAC.
- Water filter: Everpure MC2® water filter provided by Pentair plc.
- Pressure gauge: Swagelok PGI-63C-PG2000-LAQ1, 0-2000, glycerin-filled pressure gauge.
- Check valve: Swagelok SS-6C-1 Poppet Check Valve.
- Plug valves: Swagelok SS-6P4T Quarter Turn Instrument Plug Valve.
- Metering valves: Swagelok SS-SS4 Low Flow Metering Valve.
- Three-way valves: Swagelok SS-44XS6 Three-way Ball Valve.
- Flow meter: Swagelok Flowmeter Mini VAF-M1-A6R-1-0-F 0.025-0.25 GPM or an IFM SM4100 Magnetic-inductive Flow Meter.
- Water lines: Swagelok SS-T6-S-035-20 FACTORY TUBING ⅜" OD×0.035" WALL, SMLS stainless steel tubing and Swagelok SS-6BHT-12 PTFE-Lined SS Braided Hose Assembly ⅜" SS stainless steel tubing.
- Accumulator: plastic container.

After assembly, the extraction system of Example 1 may be operated according to the disclosure of this application, including according to the steps of the method illustrated by FIG. 5 and described herein.

Table 1 below provides certain results (average of three for each of parameters 1-1 through 1-3) of uses of the extraction system of Example 1, and the use thereof, wherein the extraction system has the following settings and parameters:

- 1-1: 1.5 lbs of ground coffee; 900-micron +/−100-micron grind size; Roast Type Independent; 1150 psi +/−50 psi; water temperature of 90° F. +/−10° F.; bloom temperature of 90° F. +/−5° F.; 5 minutes of residence time; collection volume of 1.5 gallons; collection time of 12 minutes
- 1-2: 1.5 lbs of ground coffee; 900-micron +/−100-micron grind size; Roast Type Independent; 1150 psi +/−50 psi; water temperature of 90° F. +/−10° F.; bloom temperature of 90° F. +/−5° F.; 10 minutes of residence time; collection volume of 1.5 gallons; collection time of 24 minutes
- 1-3: 1.5 lbs of ground coffee; 900-micron +/−100-micron grind size; Roast Type Independent; 1150 psi +/−50 psi; water temperature of 90° F. +/−10° F.; bloom temperature of 90° F. +/−5° F.; 20 minutes of residence time; collection volume of 1.5 gallons; collection time of 48 minutes Table 1 below also compares certain results of the use of extraction system of Example 1 (according to parameters 1-1 through 1-3) to the use of a Toddy® cold brew system provided by Toddy, LLC, wherein 5 lbs of ground coffee is placed into a bag or filter (which may then be closed), the bag or filter is placed into a container, room temperature water (e.g., 65-100° F.) or reduced temperature water (e.g., 32-65° F.) is poured into the container over the bag or filter, and the ground coffee and water is permitted to steep in the container for around 12 to 24 hours (24 hours for the comparison results of Table 1) at room temperature (e.g., 65-100° F.) or reduced temperature (e.g., 32-65° F.) and at atmospheric pressure (e.g., 14.7 psi). Toddy® or similar cold brew coffee systems have a yield of around 100%, producing around 5 gallons of cold brew coffee (after dilution of 2.5 gallons of extract with around 2.5 gallons of water) per 5 lbs of coffee beans. For the results of Table 1, the extraction system of Example 1 was permitted to operate until approximately 1.5 gallons of cold brew coffee were produced, resulting in the same 100% yield as that of Toddy® or similar cold brew coffee systems.

TABLE 1

|  | 1-1 | 1-2 | 1-3 |
|---|---|---|---|
| Total Time (min) | 12 | 24 | 48 |
| Volume of Product (gal) | 1.5 | 1.5 | 1.5 |
| Yield (%) (gal/lb) | 100% | 100% | 100% |
| Operating Time Relative to Toddy ® (x Faster) | 120 | 60 | 30 |

As illustrated by Table 1, the extraction system of Example 1 and as disclosed in this application produces cold brew coffee comparable in quality to the Toddy® and other similar cold brew systems, and reaches the same yield up to 30 to 120 times quicker (depending on the residence time) and without waste (e.g., single use filters and bags). The quick brewing time of the extraction system of Example 1 and as disclosed herein reduces margin for error present in the Toddy® and other similar cold brew systems, as it reduces the opportunity for bacterial growth or other dangerous contamination. It also allows a user to quickly produce additional cold brew coffee for sale or consumption should the user run out, a significant advantage to Toddy® and other similar cold brew systems that have long brewing times (e.g., 12-24 hours) and require substantial space to house the water during the extraction process. In particular, because a user can operate the extraction system of Example 1 and as disclosed in this application over 100 times per day (e.g., results of parameters 1-1), the user can produce over 150 gallons of cold brew coffee in the same amount of time as the Toddy® system, which is over 30 times more than that produced by the Toddy® system. Moreover, because the extraction system of Example 1 is highly scalable, it may be configured in any manner to produce a significantly greater amount of cold brew coffee in the same amount of time.

Table 2 below provides certain results (average of three for each of parameters 2-1 through 2-3) of uses of the extraction system of Example 1, and the use thereof, wherein the extraction system has the following settings and parameters:

2-1: 1.5 lbs of ground coffee; 900-micron +/−100-micron grind size; Roast Type Independent; 1150 psi +/−50 psi; water temperature of 90° F. +/−10° F.; bloom temperature of 90° F. +/−5° F.; 5 minutes of residence time; collection time of 14 minutes 2-2: 1.5 lbs of ground coffee; 900-micron +/−100-micron grind size; Roast Type Independent; 1150 psi +/−50 psi; water temperature of 90° F. +/−10° F.; bloom temperature of 90° F. +/−5° F.; 10 minutes of residence time; collection time of 36 minutes 2-3: 1.5 lbs of ground coffee; 900-micron +/−100-micron grind size; Roast Type Independent; 1150 psi +/−50 psi; water temperature of 90° F. +/−10° F.; bloom temperature of 90° F. +/−5° F.; 20 minutes of residence time; collection time of 84 minutes Table 2 below also compares certain results of the use of extraction system of Example 1 (according to the parameters 2-1 through 2-3) to the use a Toddy® cold brew system provided by Toddy, LLC, as described above in regard to Table 1 (24 hours for the comparison results of Table 2). For the results of Table 2, the extraction system of Example 1 was permitted to operate until the cold brew coffee product achieved a desirable flavor profile as measured by taste-testing and, for example, coffee cupping forms described above.

TABLE 2

|  | 2-1 | 2-2 | 2-3 |
|---|---|---|---|
| Total Time (min) | 15 | 36 | 84 |
| Volume of Product (gal) | 1.88 | 2.25 | 2.70 |
| Yield (%) (gal/lb) | 125% | 150% | 175% |
| Operating Time Relative to Toddy ® (x Faster) | 96 | 40 | 17 |

As illustrated by Table 2, the extraction system of Example 1 and as disclosed in this application produces cold brew coffee comparable in quality to the Toddy® and other similar cold brew systems, and reaches a desirable flavor profile of the cold brew coffee up to 17 to 96 times quicker (depending on the residence time), with a greater yield of around 125% to 180% (depending on the residence time), and without waste (e.g., single use filters and bags). The greater yields of the extraction system of Example 1 and as disclosed in this application permits users to produce a significantly greater amount of comparable cold brew coffee than the Toddy® and other similar cold brew systems using the same amount of coffee beans, reducing, among other things, cost and waste. And as with the results of Table 1, the quick brewing time of the extraction system of Example 1 and as disclosed herein reduces margin for error present in the Toddy® and other similar cold brew systems, as it reduces the opportunity for bacterial growth or other dangerous contamination. It also allows a user to quickly produce additional cold brew coffee for sale or consumption should the user run out, a significant advantage to Toddy® and other similar cold brew systems that have long brewing times (e.g., 12-24 hours) and require substantial space. In particular, because a user can operate the extraction system of Example 1 and as disclosed in this application over 16 times per day (e.g., results of parameters 2-3), the user can produce over 43.2 gallons of cold brew coffee in the same amount of time as the Toddy® system, which is over 8.5 times more than that produced by the Toddy® system. Moreover, because the extraction system of Example 1 is highly scalable, it may be configured in any manner to produce a significantly greater amount of cold brew coffee in the same amount of time. And as described above, unlike the Toddy® and other similar cold brew systems, any coffee bean type, roast type, roast date, and grind size may be used to produce cold brew coffee through extraction system 1 and, in this regard, extraction system 1 may produce unique, fully-flavored cold-brew coffee with reduced waste and cost.

Moreover, for each of parameters 1-1 through 1-3 and 2-1 through 2-3, the cold brew coffee produced using the extraction system of Example 1 has a full flavor profile that is robust and smooth as measured by taste-testing, for example, by coffee cupping forms described above. In this regard, the cold brew coffee produced using the extraction system of Example 1 is preferable to coffee brewed using increased temperature (e.g., 180-210° F.) and atmospheric pressure (e.g., 14.7 pounds per square inch ("psi")), as it is less acidic, has a different flavor profile—more robust and smoother, and is easier to consume and digest. The extraction system of Example 1 and as described herein is advantageous in that it does not use increased temperature, which permits the extraction system to extract (or leach) certain desired constituent chemical compounds in ground coffee that contribute to its flavor and that would otherwise be destroyed by increased temperatures, and to avoid extracting (or leaching) several undesired organic acids and oils constituent in ground coffee, such as quinic and chlorogenic acids that may make the coffee more acidic, adversely affect its flavor profile, and make it more difficult to consume and digest.

It has been found that different residence times result in a varying range of flavor profiles. For instance, lower residence times (e.g. 5 min; 1-1 and 2-1) may result in mild extraction of constituent chemical compounds leading to a mild mouth feel, while still retaining flavor and qualities of traditional cold brew coffee. Increasing residence time (e.g., 10 min or 20 min; 1-2, 1-3, 2-2, and 2-3) may result in increased extraction of constituent chemical compounds that impact the flavor of the cold brew coffee. A residence time of 20 minutes, for example, may result in more extraction of constituent chemical compounds leading to a more potent mouth feel, again while still retaining flavor and qualities of traditional cold brew coffee. A residence time of 20 minutes may also result in the extraction of constituent chemical compounds leading to flavor profiles resembling those experienced from a traditional pour-over coffee brewing method. A residence time of 10 minutes (e.g., 1-2 and 2-2), may result in a flavor profile that is a mixture of those resulting from both the 5 minutes and 20 minutes residence times.

Table 3 below provides certain concentration results (TDS %, and Brix %) (average of three for each of parameters 3-1 through 3-3) of the use of the extraction system of Example 1, wherein the extraction system has the following settings and parameters:

3-1: 1.5 lbs of ground coffee; 900-micron +/−100-micron grind size; Starbucks® Pike Place coffee bean; Roast Type Medium; 1150 psi +/−50 psi; water temperature of 90° F. +/−10° F.; bloom temperature of 90° F. +/−5° F.; 5 minutes of residence time; collection time of 15 minutes; 125% yield 3-2: 1.5 lbs of ground coffee; 900-micron +/−100-micron grind size; Starbucks® Pike Place coffee bean; Roast Type Medium; 1150 psi +/−50 psi; water temperature of 90° F. +/−10° F.; bloom temperature of 90° F. +/−5° F.; 10 minutes of residence time; collection time of 36 minutes; 150% yield 3-3: 1.5 lbs of ground coffee; 900-micron +/−100-micron grind size; Starbucks® Pike Place coffee bean; Roast Type Medium; 1150 psi +/−50 psi; water temperature of 90° F. +/−10° F.; bloom temperature of 90° F. +/−5° F.; 20 minutes of residence time; collection time of 84 minutes; 175% yield Concentration of extracted constituent chemical compounds of coffee within the cold brew coffee produced by the extraction system of Example 1 may be quantified through concentration measurements such as refractive index. Refractive index is a metric that describes how light passes through a medium. The refractive index (in Brix (%), for example), may be determined by measuring the angle of refraction as light passes through the cold brew coffee using, for example, a photoreactor such as the Atago Pal-Coffee (BX/TDS) Pocket Refractometer. Understanding the refractive index of the cold brew coffee may be used to calculate values to understand the concentration of total dissolved solutes (TDS) (%). Metrics of concentration (e.g., TDS) may be used as a benchmark to understand the degree of extraction and to guarantee quality and consistency of extraction. In general terms, a high TDS may indicate a highly-concentrated product and, if too high, may indicate over-extraction. In contrast, a low TDS may indicate a weakly-concentrated product and, if too low, may indicate under-extraction. The general range of acceptable TDS for cold brew coffee produced by traditional systems and methods is between around 1.0% and 1.6% TDS. For example, Starbucks® cold brew coffee was determined to have an average TDS of 1.30% +/−0.25% and an average Brix of 1.72% +/−0.25%.

Table 3 below compares certain concentration results of the use of extraction system of Example 1 (according to the parameters 3-1 through 3-3). For the results of Table 3, the extraction system of example 1 was permitted to operate until the cold brew coffee product achieved a yield of 125% (3-1), 150% (3-2), and 175% (3-3), and concentration (TDS (%) and Brix (%)) was measured after refrigeration of the cold brew coffee product.

TABLE 3

|  | 3-1 | 3-2 | 3-3 |
| --- | --- | --- | --- |
| Yield (%) (gal/lb) | 125 | 150 | 175 |
| TDS (%) | 1.80 | 1.70 | 1.47 |
| Brix (%) | 2.27 | 2.14 | 1.85 |

As illustrated by Table 3, the extraction system of Example 1 and as disclosed in this application produces cold brew coffee in substantially reduced brew times and with higher yields, while still meeting industry-preferred values for TDS and Brix for traditional systems and methods of brewing cold-brew coffee, for example, Starbucks® cold brew coffee. Qualitative metrics determined through taste-testing (using coffee cupping forms, for example) may be used in conjunction with quantitative concentration metrics such as TDS (%) and Brix (%) to allow a user to select the desired operation parameters (e.g., desired residence time, pressure, and temperature) for the extraction system 1 of the present application to achieve the desired concentration and flavor profile.

Figure 6:
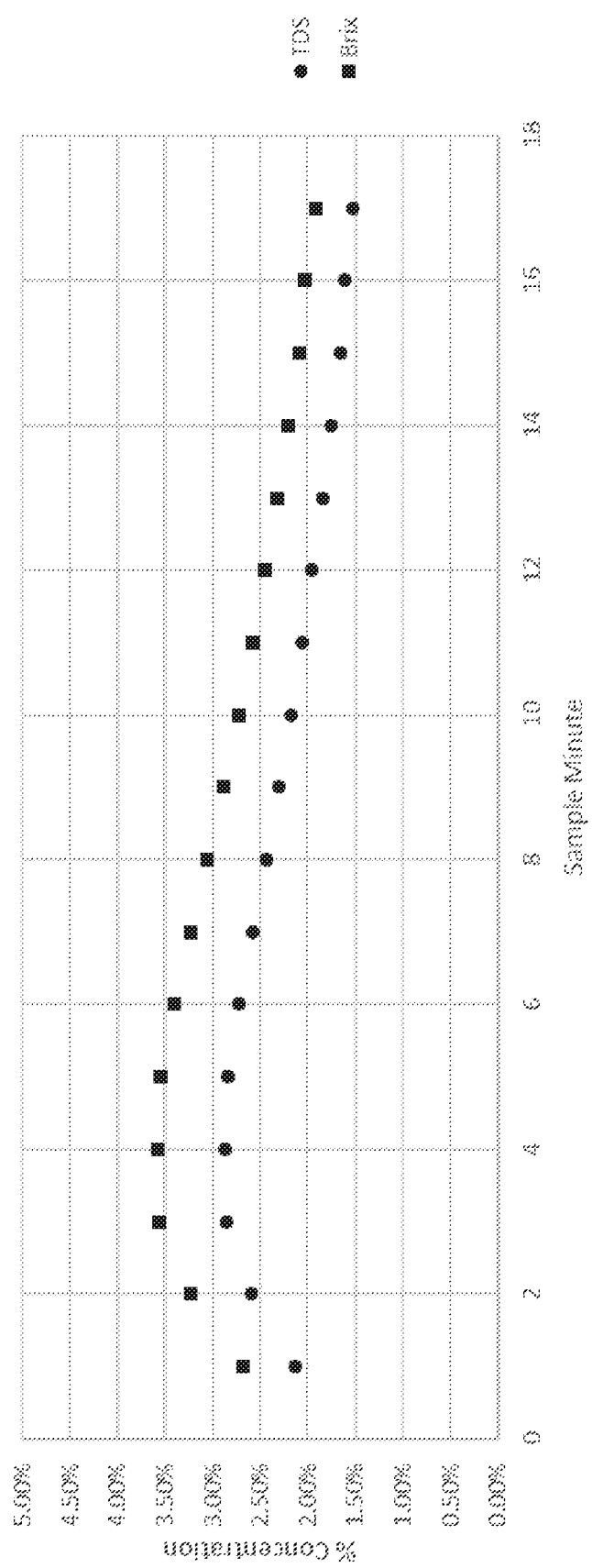
FIG. 6 illustrates data from the use of a high pressure, low temperature, continuous flow extraction system, according to techniques of the present application.
Figure 7:
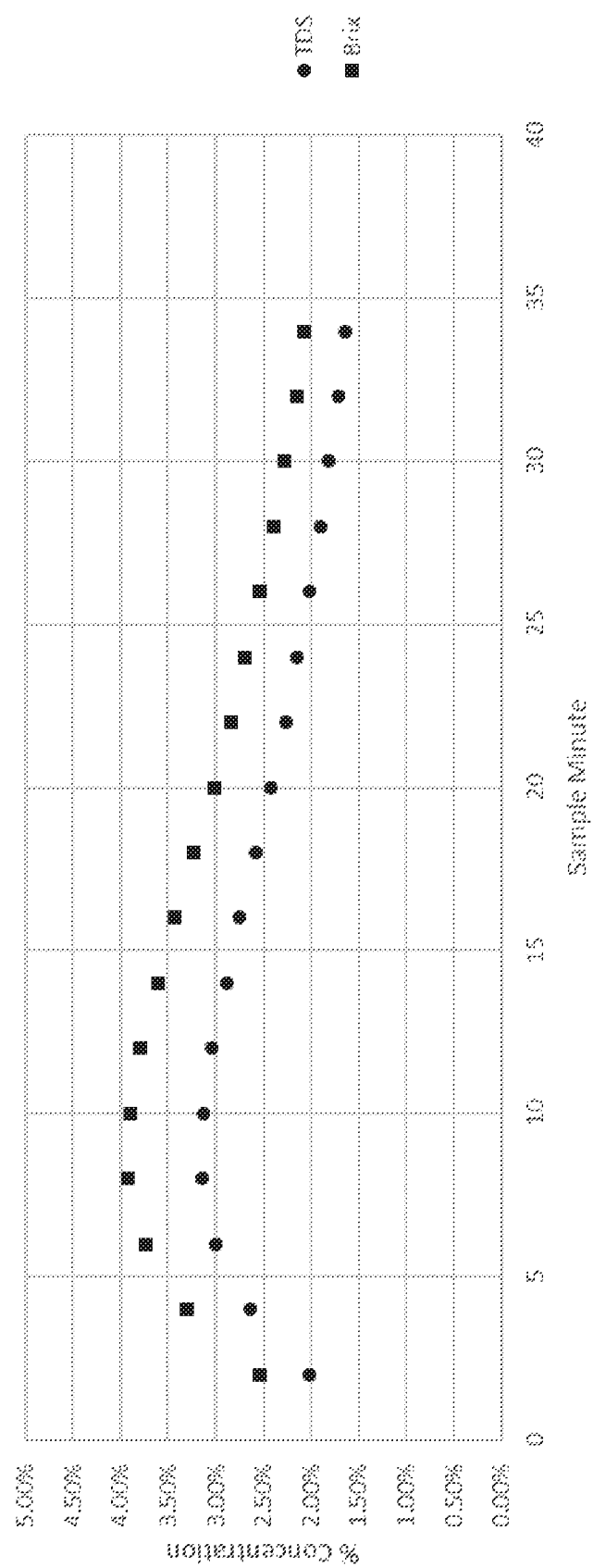
FIG. 7 illustrates data from the use of a high pressure, low temperature, continuous flow extraction system, according to techniques of the present application.
Figure 8:
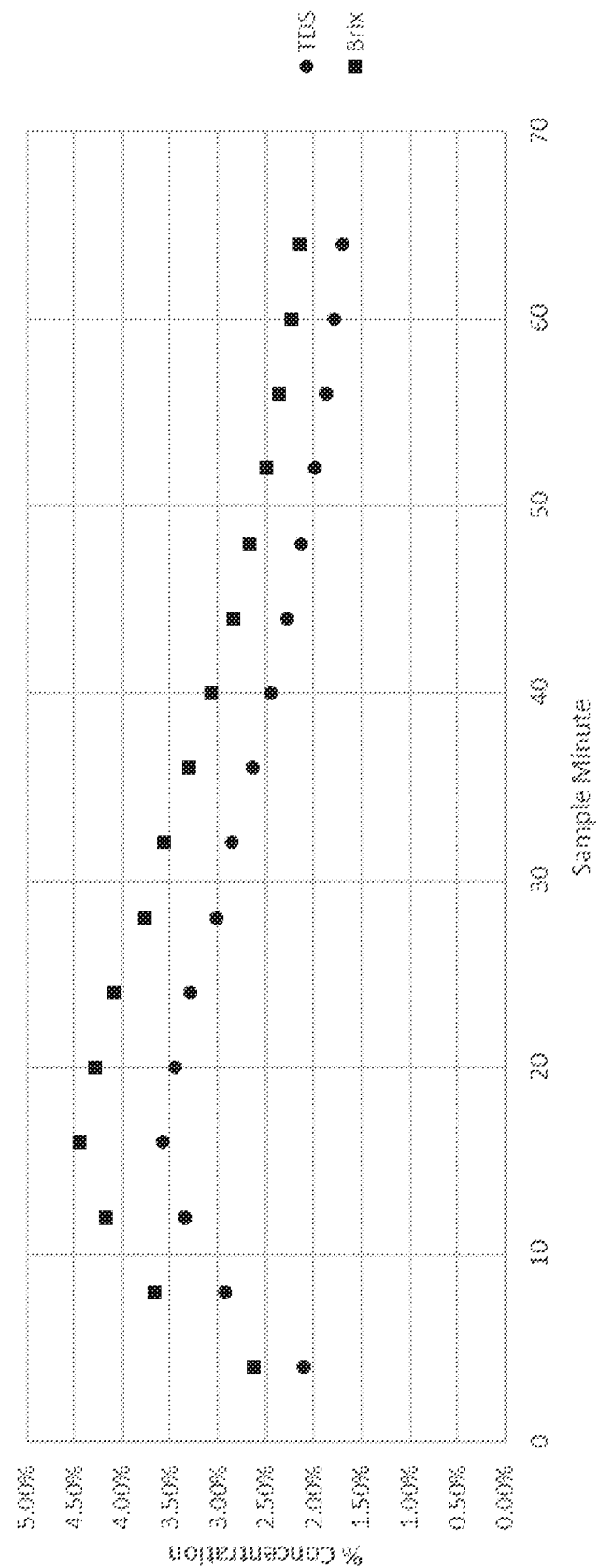
FIG. 8 illustrates data from the use of a high pressure, low temperature, continuous flow extraction system, according to techniques of the present application.

FIGS. 6-8 illustrate certain concentration results (TDS %, and Brix %) (average of three for each of the below parameters) of the use of the extraction system of Example 1, wherein the extraction system has the following settings and parameters:

FIG. 6: 1.5 lbs of ground coffee; 900-micron +/−100-micron grind size; Espresso Brioso (Columbus, Ohio) coffee type; Roast Type Medium; 1150 psi +/−50 psi; water temperature of 90° F. +/−10° F.; bloom temperature of 90° F. +/−5° F.; 5 minutes of residence time; collection time of 18 minutes; 150% yield; sample time of 1 minute FIG. 7: 1.5 lbs of ground coffee; 900-micron +/−100-micron grind size; Espresso Brioso (Columbus, Ohio) coffee type; Roast Type Medium; 1150 psi +/−50 psi; water temperature of 90° F. +/−10° F.; bloom temperature of 90° F. +/−5° F.; 10 minutes of residence time; collection time of 36 minutes; 150% yield; sample time of 2 minutes FIG. 8: 1.5 lbs of ground coffee; 900-micron +/−100-micron grind size; Espresso Brioso (Columbus, Ohio) coffee type; Roast Type Medium; 1150 psi +/−50 psi; water temperature of 90° F. +/−10° F.; bloom temperature of 90° F. +/−5° F.; 20 minutes of residence time; collection time of 72 minutes; 150% yield; sample time of 4 minutes FIGS. 6-8 illustrate certain concentration data of the use of extraction system of Example 1 (according to the parameters for each of FIGS. 6-8). For the results of FIGS. 6-8, the extraction system of example 1 was permitted to operate until producing 2.25 gallons of cold brew coffee product having a yield of 150%, and samples of the cold brew coffee product were taken every ⅛th of a gallon, or every 1 minute (FIG. 6), every 2 minutes (FIG. 7), and every 4 minutes (FIG. 8) to periodically measure the concentration (TDS %, and Brix %) during operation. In this regard, FIGS. 6-8 illustrate certain aspects of the performance of the extraction system of Example 1 during operation.

Among other advantages described herein, the extraction system described herein is quicker and more efficient (e.g., higher yields) than traditional systems and methods for producing cold brew coffee, including the Toddy® and other similar cold brew systems. The substantially shorter brew-time provides a further advantage in that it reduces the margin of error for fluctuation of water temperature, which may cause unpredictable and undesirable extractions, concentrations, and flavor profiles of cold brew coffee. In this regard, the extraction system described herein is preferable to batch and other traditional systems in that it may be used to produce consistent and reproducible cold brew coffee. Additionally, the extraction system described herein, provides a further advantage over batch systems, like the Toddy® system, in that there is a substantially continuous flow of water through the extraction system during operation. In this regard, the extraction system described herein is able to flush trapped coffee product (e.g., water with extracted constituent chemical compounds of the ground coffee) from the void spaces present in the ground coffee to allow for further extraction not otherwise permitted by a batch system. Moreover, because there is a substantially continuous flow of water through the extraction system during operation, it does not require substantial space to house the water during the extraction process. In this regard, the extraction system described herein is preferable to batch systems, as it is not limited by the size of the container necessary to hold both the water and ground coffee, and is highly scalable. The extraction system described herein also does not require additional, costly components and procedures, such as mechanical mixers, spray nozzles, recycle loops, periodic addition of materials, etc., often necessary for large batch systems.

Thus, the extraction systems and methods described herein satisfies an existing need for safer, more efficient, and scalable systems and methods for producing fluid consumables like cold brew coffee having consistent and reproducible qualities by using high pressure, low temperature, and continuous flow. In particular, the extraction systems and methods described herein satisfies an existing need for systems and methods for extracting (or leaching) high volumes of constituent chemical compounds of organic matter like ground coffee, including those that may not be extracted by extraction techniques employing increased temperatures, and systems and methods that are scalable and have quicker extraction times and higher yields than these other techniques.

It will be understood by those skilled in the art that various changes may be made and equivalents may be substituted without departing from the scope of the novel techniques disclosed in this application. For example, the extraction system of the present application may use water-based solutions to produce water-based consumables such as coffee or tea as described herein, but may also use solutions that are not water based, including oils or oil-based solutions, to extract (or leach) constituent chemical compounds of other organic matter to produce other fluid consumables that are not water based. In addition, many modifications may be made to adapt a particular situation or material to the teachings of the novel techniques without departing from their scope. Therefore, it is intended that the novel techniques not be limited to those disclosed, but that they will include all falling within the scope of the appended claims.

The invention claimed is:

1. A system comprising:
    a pump configured to supply a substantially continuous flow of water at greater than atmospheric pressure;
    a residence vessel coupled to the pump, the residence vessel further comprising:
        an input aperture,
        a chamber configured to receive organic matter selected from a group consisting of ground coffee and tea, and configured to sustain greater than atmospheric pressure, and
        an output aperture;
    wherein the residence vessel is configured to receive the substantially continuous flow of water supplied by the pump at the input aperture;
    wherein the pump and residence vessel are configured to cause the water to reside in the chamber with the organic matter at a residence time of between approximately 2 minutes and approximately 30 minutes, at a pressure of between approximately 750 psi and approximately 1500 psi, and at a temperature of between approximately 32° F. and approximately 100° F. to extract chemical compounds from the organic matter during the residence time; and
    wherein the residence vessel is configured to supply the water having extracted chemicals from the output aperture after residence.

2. The system of claim 1, wherein the organic matter is ground coffee.

3. The system of claim 2, wherein the pressure is between approximately 900 psi to approximately 1200 psi.

4. The system of claim 3, wherein the temperature is between approximately 65° F. and approximately 100° F.

5. The system of claim 4, wherein the residence time is between approximately 4 minutes and approximately 25 minutes.

6. The system of claim 5, wherein the water is selected from a group consisting of tap water, filtered water, mineral water, and distilled water.

7. The system of claim 5, wherein the pressure is approximately 1150 psi and the temperature is approximately 90° F.

8. The system of claim 5 wherein the residence time is approximately 5 minutes.

9. The system of claim 5 wherein the residence time is approximately 10 minutes.

10. The system of claim 5 wherein the residence time is approximately 20 minutes.

11. The system of claim 5, wherein the residence vessel further comprises:
    a first end-cap comprising the input aperture;
    a second end-cap comprising the output aperture;
    a capsule substantially comprising the chamber and coupled to the first end-cap and second end-cap; and
    a filter configured to maintain the ground coffee within the residence vessel.

12. The system of claim 11, wherein the pressure is approximately 1150 psi, wherein the temperature is approximately 90° F., and wherein the residence time is selected from a group consisting of approximately 5 minutes, approximately 10 minutes, and approximately 20 minutes.

13. A method comprising:
    positioning organic matter selected from a group consisting of ground coffee and tea in a residence vessel, the residence vessel comprising:

an input aperture, a chamber configured to receive the organic matter and configured to sustain greater than atmospheric pressure, and an output aperture;

supplying a substantially continuous flow of water to the residence vessel at the input aperture;

causing the water to reside in the chamber with the organic matter at a residence time of between approximately 2 minutes and approximately 30 minutes, at a pressure of between approximately 750 psi and approximately 1500 psi, and at a temperature of between approximately 32° F. and approximately 100° F. to extract chemical compounds from the organic matter during the residence time;

collecting the water having extracted chemicals from the output aperture of the residence vessel after residence.

14. The method of claim 13, wherein the organic matter is ground coffee.

15. The method of claim 14, wherein the pressure is between approximately 900 psi and approximately 1200 psi.

16. The method of claim 15, wherein the temperature is between approximately 65° F. and approximately 100° F.

17. The method of claim 16, wherein the residence time is between approximately 4 minutes and approximately 25 minutes.

18. The method of claim 17, wherein the pressure is approximately 1150 psi, wherein the temperature is approximately 90° F., and wherein the residence time is selected from a group consisting of approximately 5 minutes, approximately 10 minutes, and approximately 20 minutes.

19. An apparatus comprising:

a residence vessel comprising:

an input aperture, a chamber configured to receive organic matter selected from a group consisting of ground coffee and tea and configured to sustain greater than atmospheric pressure, and an output aperture;

wherein the residence vessel is configured to receive a substantially continuous flow of water at the input aperture;

wherein the residence vessel is configured to cause the water to reside in the chamber with the organic matter at a residence time of between approximately 2 minutes and approximately 30 minutes, at a pressure of between approximately 750 psi and approximately 1500 psi, and at a temperature of between approximately 32° F. and approximately 100° F. to extract chemical compounds from the organic matter during the residence time; and wherein the residence vessel is configured to supply the water having extracted chemicals from the output aperture after residence.

20. The apparatus of claim 19, wherein the temperature is between approximately 65° F. and approximately 100° F., the residence time is between approximately 4 minutes and approximately 25 minutes, and the pressure is between approximately 900 psi and approximately 1200 psi.

* * * * *